US007139120B2

(12) United States Patent
Sugiya

(10) Patent No.: US 7,139,120 B2
(45) Date of Patent: Nov. 21, 2006

(54) OPTICAL AMPLIFIER WITH VARIABLE GAIN EQUALIZATION

(75) Inventor: Hideaki Sugiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 10/699,655

(22) Filed: Nov. 4, 2003

(65) Prior Publication Data
US 2004/0136053 A1 Jul. 15, 2004

(30) Foreign Application Priority Data
Nov. 6, 2002 (JP) .............................. 2002-323067

(51) Int. Cl.
*H01S 3/00* (2006.01)
(52) U.S. Cl. ................................................ 359/341.42
(58) Field of Classification Search ............ 359/341.42
See application file for complete search history.

(56) References Cited

U.S. PATENT DOCUMENTS

| 6,275,330 | B1 * | 8/2001 | Izumi ..................... 359/341.42 |
| 6,359,726 | B1 * | 3/2002 | Onaka et al. ............ 359/337.1 |
| 6,429,962 | B1 * | 8/2002 | Xu et al. ................. 359/337.1 |
| 6,496,302 | B1 * | 12/2002 | Michishita ............... 359/337.1 |
| 6,594,071 | B1 * | 7/2003 | Gavrilovic et al. ...... 359/341.4 |
| 6,621,625 | B1 * | 9/2003 | Zhang et al. ........... 359/341.42 |
| 6,646,789 | B1 * | 11/2003 | Kelkar et al. ............ 359/337.1 |
| 6,707,599 | B1 * | 3/2004 | Ye et al. ................. 359/341.41 |
| 6,731,424 | B1 * | 5/2004 | Wu .......................... 359/337.1 |
| 2004/0019459 | A1 * | 1/2004 | Dietz et al. .................. 702/184 |
| 2004/0052526 | A1 * | 3/2004 | Jones et al. .................... 398/50 |

FOREIGN PATENT DOCUMENTS

JP          10-276173          10/1998

OTHER PUBLICATIONS

Weik, Martin H. Fiber Optics Standard Dictionary. 3rd Edition. 1997. pp. 814 and 489.*
US 6,967,768, 11/2005, Haggans et al. (withdrawn)*

* cited by examiner

Primary Examiner—Deandra M. Hughes
(74) Attorney, Agent, or Firm—Staas & Halsey LLP

(57) ABSTRACT

An optical amplifier, provided in a WDM transmission system, contains an amplification medium for amplifying WDM light, a measurement part for measuring at least one input optical power of the WDM light on both input and output sides of the amplification medium, a variable gain equalizer for variably setting a passing-wavelength characteristic, a database for holding data representing wavelength characteristics that respectively correspond to transmission line types, an arithmetic part for computing an inverted passing-wavelength characteristic resulting from a passing-wavelength, based on an acquired transmission line type, the optical power measured by the measurement part, and the data held in the database, and a setting part for setting a passing-wavelength characteristic of the variable gain equalizer, based on the inverted passing-wavelength characteristic computed by the arithmetic part, and with this, capable of controlling optical filters more quickly and amplifying optical signals more efficiently in WDM systems.

19 Claims, 24 Drawing Sheets

OPTICAL AMPLIFIER WITH VARIABLE GAIN EQUALIZATION

BACKGROUND OF THE INVENTION (1) Field of the Invention

The present invention relates to an optical amplifier suitable for controlling the passing-wavelength characteristic of amplified wavelength-division-multiplexed (WDM) light, and relates to a passing-wavelength characteristic control method in that optical amplifier, and an optical transmission system.

(2) Description of the Related Art

With a rapid increase in the number of Internet users and start of distribution service such as images, etc., there is an increasing strong demand for continuous access to high-speed optical networks that are the backbone of Internet. A wavelength-division multiplexing (WDM) system, which multiplexes and transmits a plurality of optical signals of different wavelengths through a single optical fiber (hereinafter referred to as a fiber), has been desired to be put to practical use, because it can increase its transmission capacity in proportion to the number of wavelengths.

Optical networks with multiple fibers connected thereto are provided with WDM-light amplifying equipment (hereinafter referred to as equipment) that transmits high-speed, large-capacity, and long-distance data. This equipment has an optical amplifier. This optical amplifier compensates for a loss of an optical signal, whereby the optical signal is relayed. The main cause of loss lies in the scattering of an optical signal outside a fiber or absorption by impurities within a fiber.

A typical example of the optical amplifier is an erbium-doped fiber amplifier (EDFA). This erbium-doped fiber amplifier is an optical amplifier consisting of an erbium-doped fiber. If light from a pump laser enters through an erbium-doped fiber, the light excites erbium atoms, which then amplify an optical signal as it passes through the erbium-doped fiber.

Conventional optical amplifiers compensate optical signals by the two following methods (J1) and (J2) in order to eliminate a deviation in gain and a deviation in loss for each wavelength:

(J1) Compensation for the undulated gain profile of an erbium-doped fiber, and (J2) Compensation for a primary tilt due to transmission line loss and stimulated Raman scattering.

The gain profile in (J1) means the gain-wavelength characteristic (where gain depends upon wavelength) of an erbium-doped fiber. The shape of this gain profile is shown, for example, in FIG. 24A and is determined by the excitation ratio of an optical fiber ($\delta 1/\delta 0$ where $\delta 1$ represents the ion density in an upper level and $\delta 0$ represents the total ion density). To make the gain-wavelength characteristic flat, the number of holes for radiation needs to be constant regardless of input optical power. Also, the operating state of an optical amplifier at this time is equivalent to an automatic gain control (AGC) state that does not depend on input optical power. However, in this AGC state, there are cases where excitation becomes unnecessary (waste).

For instance, in the case where there is sufficient output optical power at 0 (dBm), input light with an input optical power of −10 (dBm) has a value of 10 (dBm) after amplification, if the excitation ratio remains at 20 (dB). Therefore, to make the output wavelength characteristic flat, the power equivalent to 10 (dBm) obtained by amplification needs to be attenuated with an attenuator. In this case, a network administrative operator (hereinafter referred to as an administrative operator) carries out automatic level control and attaches an external optical filter to the output side of an erbium-doped fiber amplifier, thereby making the shape of the gain profile flat. The use of this external optical filer can minimize power consumption. Note that the optical filter will be described later.

If the number of relay stages (amplification stages) is increased, the gain profile is accumulated and unfavorably affects the qualities of optical signals. Because of this, in the case where transmission lines are constructed of erbium-doped fibers, optical amplifiers compensate optical signals by employing band-fixed filters that have the inverse of the gain profile of the erbium-doped fibers.

Stimulated Raman scattering in (J2) is the non-linear phenomenon of transmission fibers in which optical power is shifted from a high frequency side to a low frequency side. When monochromatic light with great power is irradiated to an optical fiber, it interacts with an optical phonon, and consequently, coherent Stokes light with a wavelength shifted by a specific quantity occurs by stimulated emission. Stimulated Raman scattering uses this phenomenon. That is, stimulated Raman scattering amplifies an optical signal by stimulated emission, by setting the wavelength of monochromatic light so that the wavelength of Stokes light becomes the same as that of the optical signal. And with stimulated Raman scattering, compensation for a primary tilt of the gain profile is made. Note that because stimulated Raman scattering occurs in a fiber having a dielectric substance, an administrative operator adjusts the output of excitation light, etc., according to the type of transmission line used.

Also, Raman amplification is amplification utilizing a stimulated Raman dispersion effect and can obtain a desired gain-wavelength characteristic by adjusting excitation light power and oscillation wavelength.

Conventional optical transmission systems connect erbium-doped filters and optical filters in multiple stages, control the excitation of the light input to the erbium-doped filters, and employ a band-fixed filter to suppress noise light that is outside that band.

In this way, conventional optical transmission systems can utilize components that are now in use, and realize reliability and low prices. The optical transmission systems further compensate for a low-noise tilt (which is a parameter representing the primary tilt of the gain of an optical amplifier) by using a Raman fiber amplifier together. Because the output level after amplification is not uniform in wavelength, each distant station monitors the primary tilt of the gain. Unless otherwise noted, distant stations include repeaters, repeater stations, repeater nodes, and optical WDM stations (terminal stations).

Furthermore, there has been proposed a method employing an optical filter. This optical filter is a variable gain equalizer that can variably tune the amount of gain or loss for each wavelength. This optical filter has small power consumption as an optical amplifier and uses active components that can tune gain and loss. This function is realized, for instance, by variable filters (trade name: active gain equalizer), etc. In the method employing the optical filter, the optical amplifier controls the wavelength characteristic of the variable filter by monitoring output optical power of desired wavelengths with an optical spectrum analyzer (e.g., see Japanese Laid-Open Patent Publication No. HEI 10-276173).

In the multiplexing method disclosed in the aforementioned publication, signal light with wavelengths multiplexed within a multiplexer unit is transmitted through a tunable filter, and the level is measured for each wavelength with a photodiode. Based on the detected levels, a setting part adjusts a variable attenuator so that the levels are tuned to a fixed value. Thus, the levels of WDM light can be automatically tuned at all times.

FIG. 24B shows an example of an optical power monitor employing an optical spectrum analyzer. At the gain block 200a of an optical amplifier 200 shown in the figure, an input optical signal is amplified. The amplified light is branched for each wavelength at a demultiplexer 200b. The branched optical signals are compensated at a plurality of optical filters 200c whose pass-bands are different from one another. The compensated optical signals are multiplexed at a multiplexer 200d. The multiplexed signal is again amplified at a gain block 200a and output to an optical amplifier of the next stage (not shown). The WDM light output from the gain block 200a is monitored at an optical spectrum analyzer (OSA) 200e, whereby the quantities of loss of the optical filters 200c are tuned to a previously set compensation quantity.

The method employing the optical filters 200c can reduce the power consumption and cost of redundant components. Therefore, this method can eliminate a deviation in gain for each wavelength that conventional optical amplifiers have.

Conventional optical transmission systems flatten the wavelength characteristics of repeater's amplification and amplified output signals, by a combination of erbium-doped fiber amplifiers and Raman fiber amplifiers. Also, optical signals are compensated by optical filters alone, or by a combination of optical filters and stimulated Raman scattering.

In the case of a combination of optical filters and stimulated Raman scattering, when stimulated Raman scattering is employed as a second-stage amplifier, the wavelength characteristic of the erbium-doped fiber of the first stage has an unfavorable influence on the stimulated Raman scattering of the second stage. More specifically, if the shape of the gain profile of the erbium-doped fiber changes according to the secondary operating point, an administrative operator cannot cause the gain obtained by the stimulated Raman scattering of the second stage to be active or tunable according to wavelengths. This reason is because the gain profile obtained by stimulated Raman scattering is determined by the transmission line type used. Therefore, if stimulated Raman scattering is used as a second-stage amplifier, compensation for only a wavelength band lost is made.

Because of this, an administrative operator adjusts the excitation light output of the erbium-doped fiber amplifier of the first stage so that the secondary operating point does not change. The administrative operator also performs repeater's amplification by using a Raman fiber amplifier together as occasion demands. More specifically, each repeater controls filter characteristics to the optimum state by employing an optical wavelength monitor.

However, in the case of using optical wavelength monitors, optical transmission systems have to transfer monitoring light with a specific wavelength at all the bands of an optical amplifier. Besides, the monitoring light is unnecessary because it is used solely for the purpose of monitoring the gain-wavelength characteristic of the optical amplifier. Moreover, the administrative operator must cause customers to purchase redundant equipment such as an optical spectrum analyzer for monitoring, etc. Therefore, the initial introduction cost that is imposed on customers is increased.

Also, in the filter control method that employs an optical spectrum analyzer, etc., optical amplifiers feed monitored results back to the upstream side of a transmission line. This feedback control is accurate, but is susceptible to external disturbance when increasing or decreasing wavelength channels (channels allocated to light wavelengths). This filter control method requires a considerable time until control becomes stable. In general, if interrupting transfer is needed when networks are connected in mesh form, fault recovery operation is indispensable and that interruption transfer is also time-consuming. Therefore, gain tuning that employs optical wavelength monitors is temporally difficult and is not practical control.

Furthermore, the above-described optical amplifiers, such as an erbium-doped fiber amplifier, Raman fiber amplifier, etc., are not efficient in operation and contain many redundant portions that increase both power consumption and equipment costs. Erbium-doped fiber amplifiers, and excitation lasers for stimulated Raman scattering, consume great power. Therefore, each device requires a means of radiating heat generated by great power. This heat-radiating means increases the size and cost of the transmission system. Particularly, the large size of Raman fiber amplifiers causes increased costs.

SUMMARY OF THE INVENTION

The present invention has been made in view of the above-described circumstances. Accordingly, it is an object of the present invention to provide an optical amplifier, a passing-wavelength characteristic control in the optical amplifier, and an optical transmission system that are capable of controlling optical filters more quickly and amplifying optical signals more efficiently in wavelength-division multiplexing (WDM) transmission systems. Another object of the present invention is to provide an optical amplifier, a passing-wavelength characteristic control in the optical amplifier, and an optical transmission system that are not required to change allocated optical wavelengths when expanding networks and are immune to external disturbance when increasing or decreasing the number of optical wavelengths. Still another object of the present invention is to provide an optical amplifier, a passing-wavelength characteristic control in the optical amplifier, and an optical transmission system which are capable of reducing initial introduction costs with a simple construction.

To achieve the objects of the present invention described above, there is provided an optical amplifier comprising: an amplification medium for amplifying wavelength-division-multiplexed (WDM) light; a measurement part for measuring either input optical power of the WDM light on an input side of the amplification medium or output optical power of the WDM light on an output side of the amplification medium, or both of them; a variable gain equalizer connected on a transmission line and capable of variably setting a passing-wavelength characteristic; a database for holding at least data representing wavelength characteristics that respectively correspond to transmission line types; an arithmetic part for computing an inverted passing-wavelength characteristic resulting from a passing-wavelength characteristic of the variable gain equalizer, based on an acquired transmission line type, the optical power measured by the measurement part, and the data held in the database; and a setting part for setting a passing-wavelength characteristic of the variable gain equalizer, based on the inverted passing-wavelength characteristic computed by the arithmetic part. Therefore, WDM transmission systems employing the above-described optical amplifier can smooth loss-wavelength and gain-wavelength characteristics without using additional components such as optical spectrum analyzer, etc. The size and cost of equipment are reduced and dummy light becomes unnecessary, so a substantial reduction in cost of a repeater station and optical transmission system can be achieved.

(2) An optical amplifier of the present invention may be equipped with an amplification medium, a measurement part, a variable gain equalizer, a database, an acquisition part for acquiring transmission line types, an arithmetic part, and a setting part. If done in this manner, a control target value at the time of the boot of the optical amplifier can be properly set, so the time from the boot of an optical transmission system to the start of signal communication can be shortened. Therefore, the optical transmission system using this optical amplifier can prevent a control system (e.g., an optical spectrum analyzer) from being disturbed when increasing or decreasing the number of system components, and can also prevent an adverse influence over optical signals having wavelengths other than the wavelengths related to the increase or decrease of system components. Furthermore, the optical transmission system can be stabilized.

(3) In the optical amplifier of the present invention, the aforementioned measurement part may be constructed to measure a power of excitation light on the input side of the amplification medium. If done in this manner, the variable gain equalizer can obtain a proper pass-band characteristic, based on both the measured optical power and the wavelength characteristic data held in the database.

(4) The aforementioned database may be constructed to further hold information about a transmission line length connected to the amplification medium. If done in this manner, loss-wavelength characteristics can be previously predicted, so compensation can be made with a different weight for each wavelength.

(5) The aforementioned database may be constructed to hold wavelength characteristics respectively corresponding to the input optical power and output optical power of a centralized amplification type transmission line. Also, the aforementioned arithmetic part may be constructed to compute the inverted passing-wavelength characteristic, based on the wavelength characteristics corresponding to the input optical power and output optical power held in the database. If done in this way, a control target value at the time of the boot of the variable gain equalizer can be properly set. Therefore, for instance, the time from the boot of an optical transmission system to the start of the signal communication between repeater stations can be shortened.

The database is applicable to two types of transmission lines, a centralized amplification type transmission line and a transmission-line amplification type transmission line.

(6) The aforementioned arithmetic part may be constructed to compute an inverted passing-wavelength characteristic so that gain of a centralized amplification type transmission line is constant. If done in this manner, system operation is stabilized when increasing or decreasing the number of system components.

(7) The aforementioned arithmetic part may be constructed to compute an inverted passing-wavelength characteristic, based on data causing the number of multiplexed wavelengths and a wavelength characteristic due to a stimulated Raman scattering effect to correspond to each other. In this case, the computation of the inverted passing-wavelength characteristic of the variable gain equalizer can be simplified.

(8) The aforementioned acquisition part may be constructed to obtain at least either information about a type of transmission line connected to the amplification medium or information about a length of the transmission line, from either monitoring light from an upstream side of the transmission line or, a device-monitoring system that monitors a status of transmission. In this case, updated information can be efficiently utilized.

(9) The aforementioned database may hold a wavelength characteristic corresponding to a power of excitation light of a transmission-line amplification type transmission line. Also, the aforementioned arithmetic part may be constructed to compute the inverted passing-wavelength characteristic, based on the wavelength characteristics respectively corresponding to the power of excitation light held in the database and the output optical power measured by the measurement part. In this case, loss-wavelength characteristics can be readily obtained regardless of the transmission line type used. Also, the variable gain equalizer is controlled when it is booted and after it has been booted.

(10) The aforementioned arithmetic part may be constructed to compute the inverted passing-wavelength characteristic, based on the data representing wavelength characteristics that respectively correspond to transmission line types, contained in light received from a first direction side and provided on the first direction side, and based on the number of multiplexed wavelengths contained in light received from a second direction side. Also, the aforementioned setting part may be constructed to set a passing-wavelength characteristic of a portion in the first direction side of the transmission line. In this case, the computation of the inverted passing-wavelength characteristic of the variable gain equalizer can be simplified.

(11) The aforementioned amplification medium may employ a centralized amplification type transmission line to amplify WDM light. Also, the aforementioned setting part may be constructed to set the passing-wavelength characteristic, based on input optical power and output optical power of the centralized amplification type transmission line, after the variable gain equalizer has been booted. In this case, wavelength characteristics can be properly controlled before and after the optical amplifier is booted.

(12) The aforementioned amplification medium may employ a Raman amplification type transmission line to amplify WDM light. Also, the aforementioned setting part may be constructed to set the passing-wavelength characteristic, based on power of excitation light of the Raman amplification type transmission line, after the variable gain equalizer has been booted. In this case, quick wavelength characteristic control and efficient amplification become possible. For example, networks can be expanded without changing optical wavelength bands already allocated to customers by an administrative operator.

The computation of inverted passing-wavelength characteristics by the aforementioned arithmetic part, and the setting of passing-wavelength characteristics by the aforementioned setting part, can be performed by the two following methods.

(13) The aforementioned arithmetic part computes the inverted passing-wavelength characteristic for the first direction side, based on the data contained in received light. Also, the aforementioned setting part sets the inverted passing-wavelength characteristic to a portion in the first direction side of the transmission line, based on the data held in the database.

(14) The aforementioned arithmetic part computes the inverted passing-wavelength characteristic for the first direction side, based on the first data from the self-station. Also, the aforementioned setting part sets the inverted passing-wavelength characteristic to a portion in the first direction side of the transmission line, based on the second data held in the database.

Thus, the data required for computing the loss-wavelength characteristic of the optical filter can be acquired from various directions, so the transmission system is less susceptible to external disturbance.

(15) In accordance with the present invention, there is provided a passing-wavelength characteristic control method in an optical amplifier, comprising the steps of: measuring either input optical power of WDM light on an input side of an amplification medium that amplifies the WDM light, or output optical power of the WDM light on an output side of the amplification medium, or both of them, by a measurement part connected to the amplification medium; acquiring a transmission line type by an acquisition part connected to the measurement part; computing an inverted passing-wavelength characteristic of a variable gain equalizer connected on the transmission line and capable of variably setting a passing-wavelength characteristic by an arithmetic part connected to the measurement part, based on the optical power measured at the measurement part, the acquired transmission line type, and at least data, held in a database, which represents wavelength characteristics that respectively correspond to transmission line types; and setting a passing-wavelength characteristic of the variable gain equalizer, based on the inverted passing-wavelength characteristic computed at the arithmetic part, by a setting part connected to the arithmetic part.

Therefore, when the optical amplifier is operated with a small number of wavelengths at the time of initial introduction, the variable gain equalizer is feedback controlled in an early optimum state. Therefore, control can be simplified. Even after the variable gain equalizer has been booted, the pass-band characteristic of the equalizer can be properly controlled to the theoretically optimum pass-band characteristic, based on the results of measurement of monitored values.

(16) In accordance with the present invention, there is provided an optical transmission system comprising: a transmission line for transmitting an optical signal; and an optical amplifier for amplifying wavelength-division-multiplexed (WDM) light that is transmitted through the transmission line, wherein the optical amplifier comprises an amplification medium for amplifying the WDM light, a measurement part for measuring either input optical power of the WDM light on an input side of the amplification medium or output optical power of the WDM light on an output side of the amplification medium, or both of them, a variable gain equalizer connected on the transmission line and capable of variably setting a passing-wavelength characteristic, a database for holding at least data representing wavelength characteristics that respectively correspond to transmission line types, an arithmetic part for computing an inverted passing-wavelength characteristic resulting from a passing-wavelength characteristic of the variable gain equalizer, based on an acquired transmission line type, the optical power measured by the measurement part, and the data held in the database, and a setting part for setting a passing-wavelength characteristic of the variable gain equalizer, based on the inverted passing-wavelength characteristic computed at the arithmetic part.

Therefore, the optical transmission system can prevent a control system from being disturbed when increasing or decreasing the number of system components. Thus, the optical transmission system can be stabilized.

BRIEF DESCRIPTION OF THE DRAWINGS

The present invention will be described in further detail with reference to the accompanying drawings wherein.

DESCRIPTION OF THE PREFERRED EMBODIMENTS

Embodiments of the present invention will hereinafter be described with reference to the drawings.

(A) Description of the First Embodiment

Figure 1:
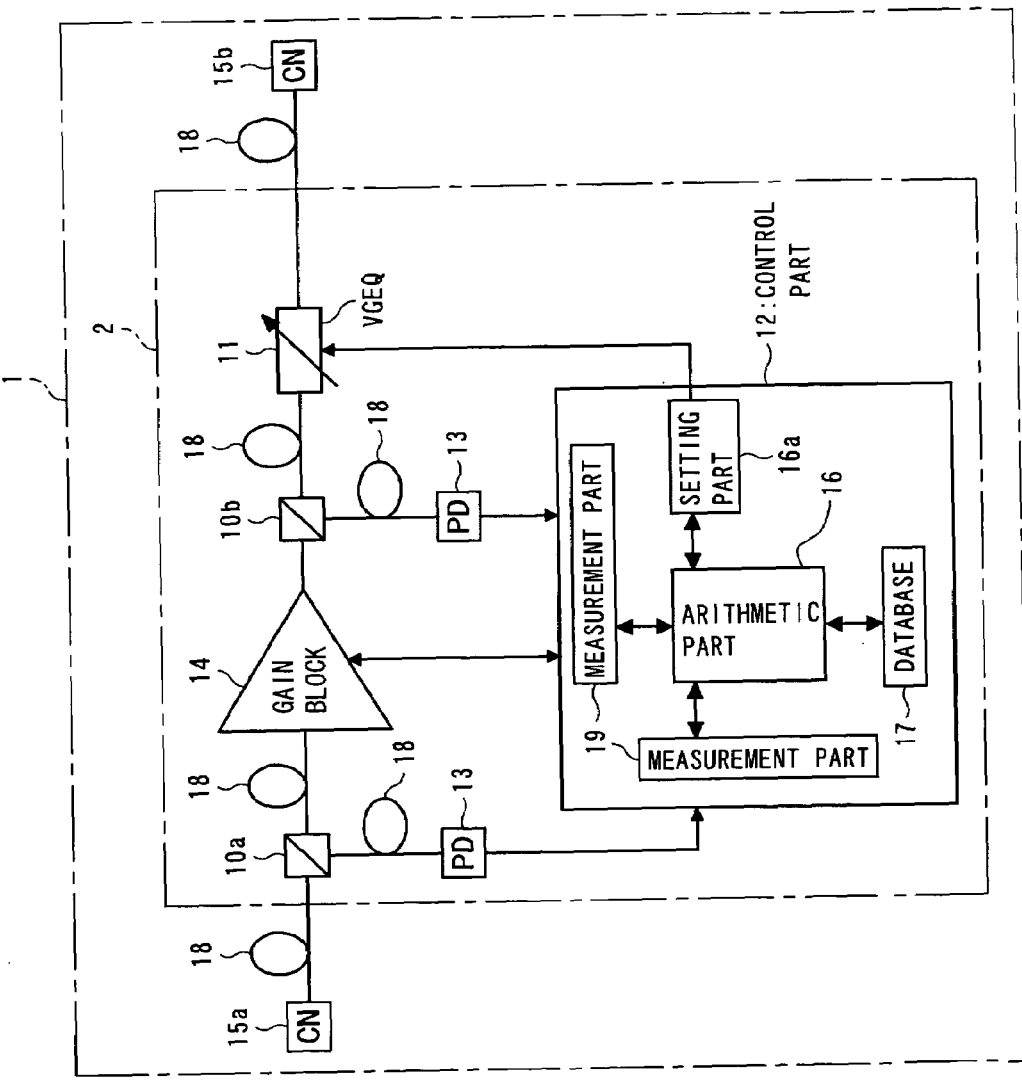
FIG. 1 is a diagram for explaining the principle of operation of an optical transmission system to which the present invention is applied.

FIG. 1 is a diagram to explain the principle of operation of an optical transmission system to which the present invention is applied. The optical transmission system 1 shown in the figure is a system to transmit wavelength-division-multiplexed (WDM) light and is equipped with core networks (CN) 15a, 15b, a transmission line (fiber) 18, and an optical amplifier 2.

The core networks 15a, 15b are both trunk circuits to perform large-capacity optical transmission. The transmission line 18 is used for transmitting optical signals. Also, the optical amplifier 2 is used for amplifying WDM light that travels through the transmission line 18.

In the following description, the transmission direction of optical signals is assumed to be a direction from the first core network 15a toward the second core network 15b, unless otherwise specified.

This optical amplifier 2 serves, for example, as a booster that boosts the strength of an optical signal by directly amplifying light, or as a repeater that relays optical signals. The optical amplifier 2 is equipped with optical couplers 10a, 10b, a gain block 14, an optical filter (optical pass-band filter) 11, photodiodes 13, and a control part 12.

The first optical coupler 10a is used for outputting light that monitors the input optical power transferred from the transmission line 18. That is, the first optical coupler 10a branches input light at a branching ratio such as 10:1, etc., and outputs the branched light. The second optical coupler 10b outputs light that monitors the output optical power transferred from the gain block 14. These optical couplers 10a, 10b can set a plurality of branching ratios and can select them properly.

The photodiodes 13 are photodetectors (PDs) for monitoring, and they are provided on the input and output sides of the gain block 14, respectively. The photodiodes 13 monitor the power of the branched input monitoring light (total light power) and the power of branched output monitoring light (total light power), output by the optical couplers 10a and 10b, respectively. In the required range, the required precision is obtained. Each of the photodiodes 13 inputs a current corresponding to optical power to measurement means (measurement part 19 to be described later) provided in the control part 12. The control part 12 obtains optical power by measuring the current with the measurement means.

The gain block 14 is a medium to amplify WDM light and is constructed of a rare earth-doped fiber amplifier (centralized amplification type amplifier) or Raman fiber amplifier (transmission-line amplification type amplifier). An example of the rare earth-doped fiber amplifier is an erbium-doped fiber (EDF) amplifier.

The optical filter 11 is connected on the transmission line 18 and can variably set its passing-wavelength characteristic, and serves as a variable gain equalizer (VGEQ). That is, the optical filter 11 is tunable and has a proper passing-wavelength characteristic set by the control part 12. This compensates for a wavelength band lost. Also, the control part 12 can control the optical filter 11 so that the profile of the passing-wavelength characteristic becomes flat with respect to wavelengths.

After the optical amplifier 2 has been booted, the light from optical filter 11 is monitored so that it is feedback controlled. On the other hand, in the gain profile of an erbium-doped fiber amplifier (EDFA), the gain-wavelength characteristic of a point within a curve representing a gain-wavelength characteristic obtained by experiment, etc., is obtained by interpolation, while the gain-wavelength characteristic of a point outside the curve is obtained by extrapolation. Therefore, gain-wavelength characteristics are predictable, and using these gain-wavelength characteristics, the optical filter 11 is set before and after the optical amplifier 2 is booted.

Furthermore, because the tilted quantity of the transmission line 18 is slight and an administrative operator can obtain information about a transmission line length from customers utilizing networks, the tilted quantity is also predictable. Therefore, before starting operation of the optical amplifier 2, the administrative operator is able to determine a known compensation quantity, based on gain-wavelength characteristics. Hence, before the optical amplifier 2 is booted, gain-wavelength characteristics are predicted and are utilized in the optical amplifier 2.

The control part 12 computes the passing-wavelength characteristic of the optical filter 11 and sets the inverse of the computed passing-wavelength characteristic to the optical filter 11. The control part 12 is equipped with a measurement part 19, a database (data-holding part or data-holding table) 17, an arithmetic part (processing part) 16, and a setting part 16a.

The measurement part 19 is used for measuring the input power of WDM light on the input side of the gain block 14, the output power on the output side of the gain block 14, and the excitation power on the input side of the gain block 14. (These powers will hereinafter be referred to as optical powers.)

Figure 6A:
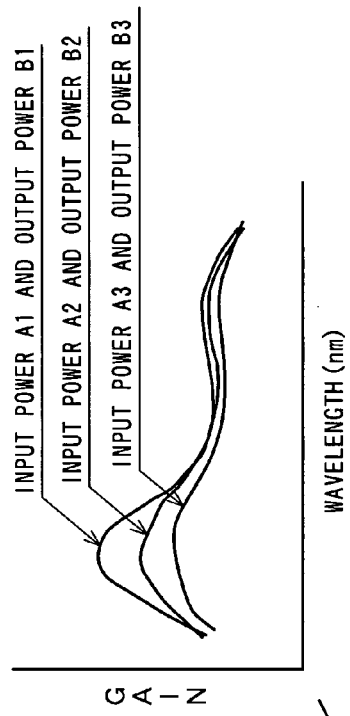
FIG. 6A is a diagram showing an example of the loss-wavelength characteristic data of a transmission line.
Figure 6B:
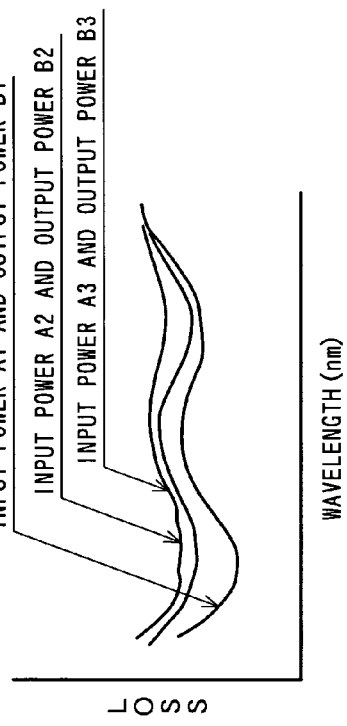
FIG. 6B is a diagram showing an example of the gain-wavelength characteristic data of a gain block.

The database 17 is memory or table that holds data indicating a loss-wavelength characteristic (where loss depends on wavelength) for each type of transmission line 18, and data indicating gain-wavelength characteristics with the input and output powers or excitation power of the gain block 14 as parameters. For example, the loss-wavelength characteristic of a single-mode fiber is held as a loss-wavelength characteristic, as shown in FIG. 6A described in detail later. As shown in FIG. 6B, this loss-wavelength characteristic is also held with the input and output powers (A1, B1), (A2, B2) and (A3, B3) of an erbium-doped fiber amplifier (single-mode fiber) as parameters.

More specifically, when the gain block 14 is constructed of a centralized amplification type amplifier such as an erbium-doped fiber amplifier, etc., the database 17 holds gain-wavelength characteristics with the input and output powers of the erbium-doped fiber amplifier as parameters. When the gain block 14 is constructed of a transmission-line amplification type amplifier such as a Raman fiber amplifier, the database 17 holds gain-wavelength characteristics with excitation power as a parameter. Thus, the database 17 holds gain-wavelength characteristics in accordance with the amplifier type used. The database 17 always holds the data shown in FIGS. 6A and 6B, also holds transmission line lengths (information about transmission line lengths), and further holds data which compensates for the gain non-uniformity of the gain block 14. Because loss-wavelength characteristics are predictable from the transmission line length data and compensation data, compensation can be made with a different weight for each wavelength.

Gain-wavelength characteristics are determined by the values of the loss-wavelength characteristics of a single-mode fiber and a nonzero dispersion-shifted fiber per unit length, and the values of the input and output optical powers of an erbium-doped fiber amplifier. Single-mode fibers can carry only a single mode and have no modal dispersion (in the case where multiple modes are transmitted, a transmission band is narrowed due to a difference in speed) and have a wide band. On the other hand, nonzero dispersion-shifted fibers are used for avoiding a non-linear phenomenon and are constructed so that the zero dispersion wavelength band and transmission wavelength band of a fiber are separated from each other.

Figure 5:
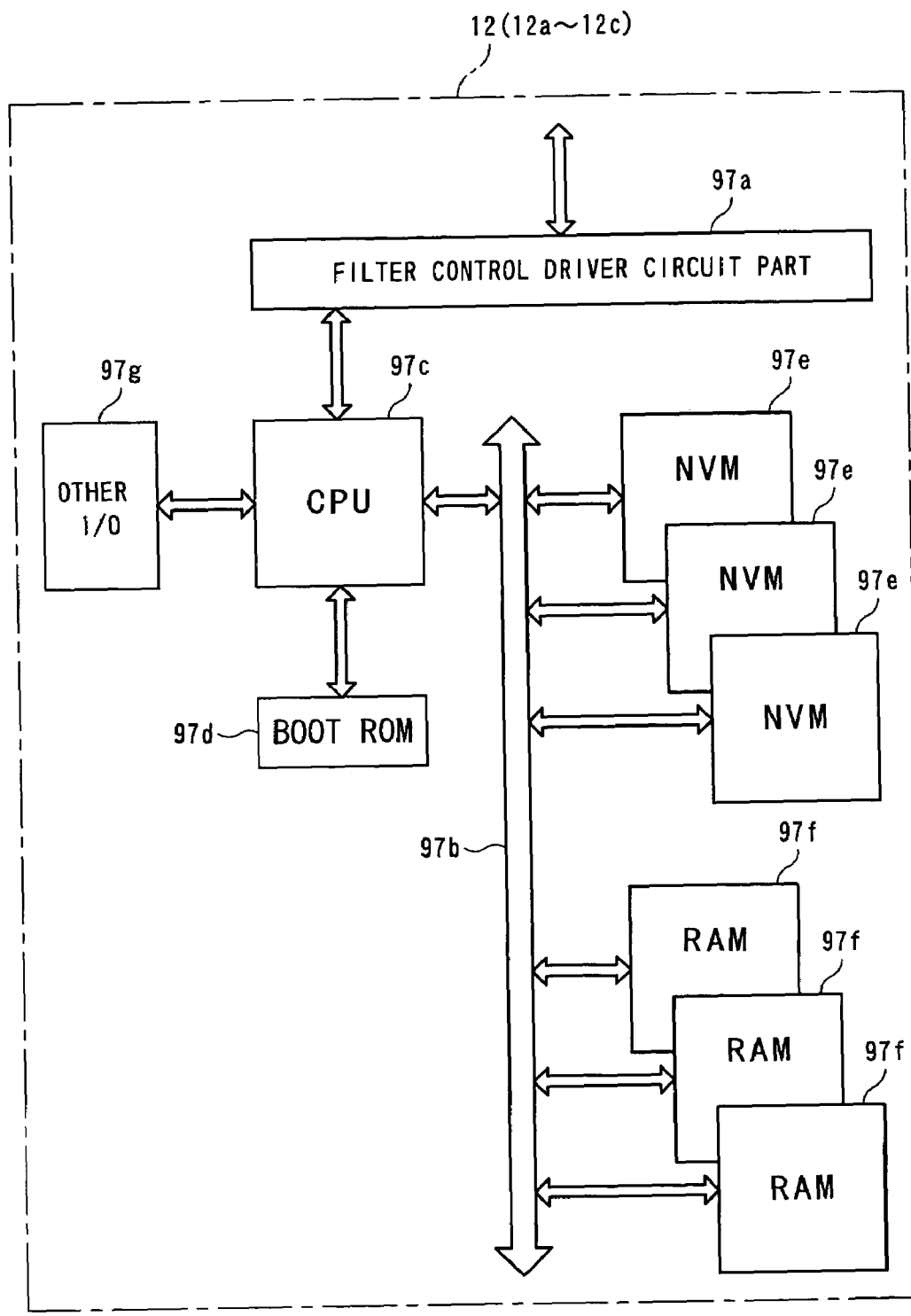
FIG. 5 is a block diagram of a control part constructed in accordance with the first embodiment of the present invention.

The function of the database 17 is exhibited, for example, by the nonvolatile memory shown in FIG. 5. Wavelength characteristic data are recorded on the nonvolatile memory, for instance, when shipping the optical amplifier 2 from a factory as a product. And when booting the optical filter 11, the control part 12 reads out wavelength characteristic data from the database 17 and sets that wavelength characteristic data to the optical filter 17. That is, the control part 12 acquires the type of transmission line 18 used, from the database 17 provided in itself. Note that the database 17 may be provided outside the control part 12.

Thus, in the case of erbium-doped fiber amplifiers, a gain-wavelength characteristic is held with the input and output optical powers of the optical amplifier 2 as parameters. Also, the database 17 holds a plurality of gain-wavelength characteristics (characteristics data) corresponding to types of transmission lines 18. Further, the database 17 can hold wavelength characteristics (characteristics data) that are obtained when the optical amplifier 2 is booted and after it has been booted.

In this case, the state of the optical filter 11 is always monitored, so it becomes possible to operate the optical transmission system 1 more efficiently.

The arithmetic part 16 (see FIG. 1) computes the inverse of the wavelength characteristic of the optical filter 11, based on the acquired information about the transmission line 18, optical power measured by the measurement part 19, and data held in the database 17.

In order to obtain the inverted passing-wavelength characteristic, in the arithmetic part 16 the total wavelength characteristic as an optical signal must be computed from the database 17. The data that are needed by the arithmetic part 16 are (A) input and output transmission line (fiber) types, (B) input and output transmission line (fiber) lengths, and (C) input and output optical powers.

That is, wavelength characteristics (gain-wavelength characteristic and loss-wavelength characteristic) are both determined by the input and output optical powers (total power) and gain (total power) of an erbium-doped fiber amplifier, and the type and length (transmission line length, span length, or fiber span length) of transmission line 18. Also, the input optical power and output optical power are both acquired by the measurement part 19, and the type and length of transmission line 18 are both acquired from data held in the database 17.

The setting part 16a sets the passing-wavelength characteristic of the optical filter 11, based on the inverted passing-wavelength characteristic computed by the arithmetic part 16. Note that the arithmetic part 16 maybe provided in the optical filter 11. In this case, the results of computation obtained by the optical filter 11 are returned to the control part 12, which controls the optical filter 11, using the results of computation.

Therefore, in the passing-wavelength characteristic control method in the optical amplifier of the present invention, the measurement part 19 connected to the gain block 14 that amplifies WDM light measures both the input power of the WDM light on the input side of the gain block 14 and the output power of the WDM light on the output side of the gain block 14. Also, the acquiring part (32, 13) connected to the measurement part 19 acquires the type of transmission line 18 used. The arithmetic part 16 connected to the measurement part 19 computes the inverted passing-wavelength characteristic of the optical filter 11, connected on the transmission line 18 and having a variable passing-wavelength characteristic, based on the optical power measured by the measurement part 19, acquired type of transmission line 18, and data held in the database 17 indicating the passing-wavelength characteristic of each type of transmission line 18. The setting part 16a connected to the arithmetic part 16 sets the passing-wavelength characteristic of the optical filter 11, based on the inverted passing-wavelength characteristic computed by the arithmetic part 16.

The control part 12 boots the optical filter 11 with the passing-wavelength characteristic set to the optical filter 11. Therefore, the database 17 holds wavelength characteristics (characteristics data) that respectively correspond to the input optical power and output optical power of a centralized amplification type transmission line, and the arithmetic part 16 computes an inverted passing-wavelength characteristic, based on the wavelength characteristics (characteristics data) respectively corresponding to the input optical power and output optical power held in the database 17.

Thus, in the case of initial introduction, when the optical transmission system 1 is being operated with a small number of multiplexed wavelengths, the optical filter 11 is feedback controlled in a nearly optimum state and therefore control can be simplified.

Therefore, even after it has been booted, the pass-band characteristic of the optical filter 11 is suitably controlled to the theoretically optimum pass-band characteristic, based on the results of measurement of monitored values.

In FIGS. 2 to 7, a description will be given of a passing-wavelength control method in the case where the gain block 14 is constructed of an erbium-doped fiber amplifier, and in FIG. 8, a description will be given in the case where the gain block 14 is constructed of a Raman fiber amplifier.

Figure 2:
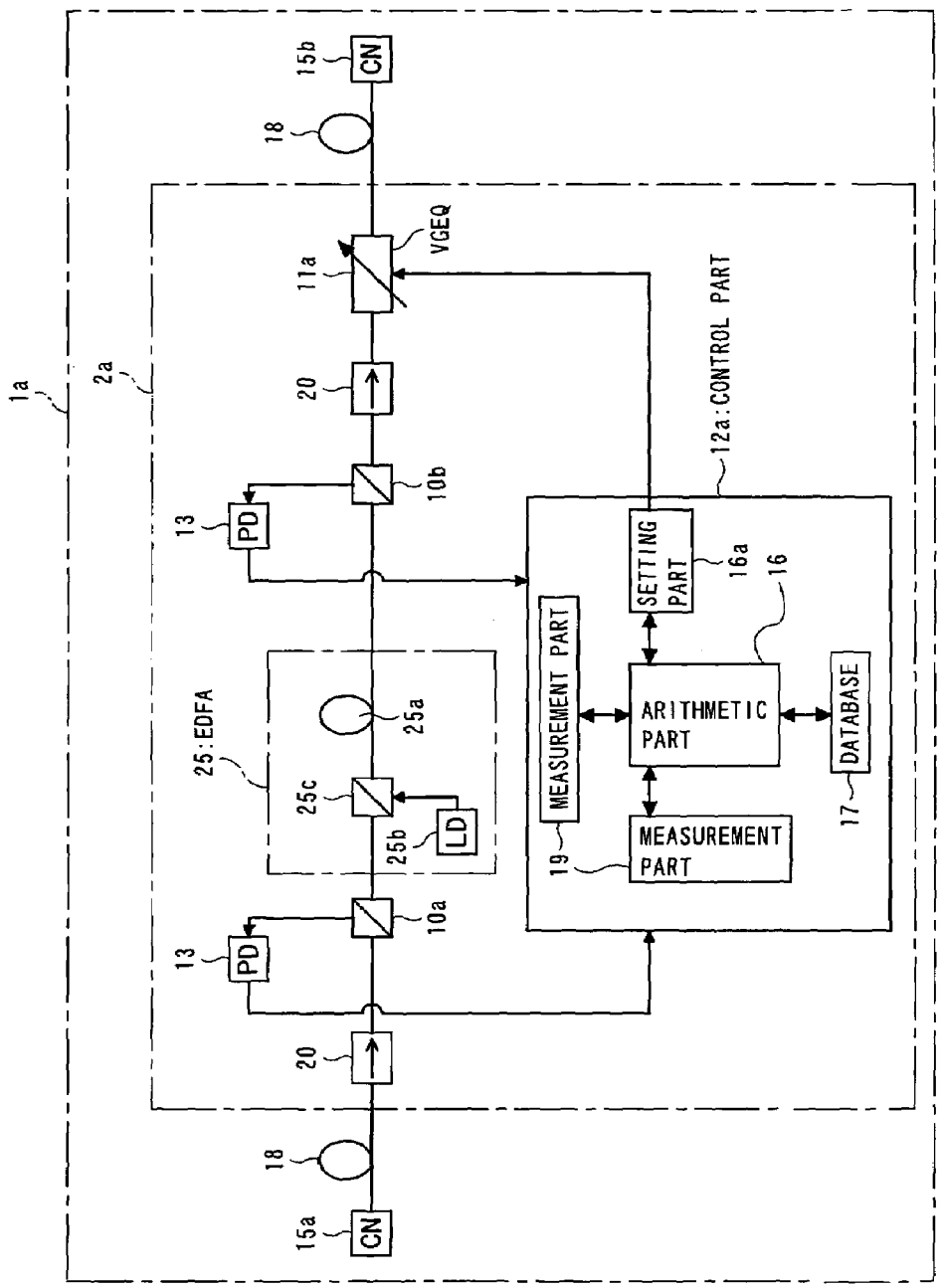
FIG. 2 is a diagram showing an optical WDM transmission system constructed in accordance with a first embodiment of the present invention.

FIG. 2 shows an optical WDM transmission system constructed in accordance with a first embodiment of the present invention. The optical transmission system 1a shown in the figure is used for transmitting WDM light and is provided with an optical amplifier 2a which is constructed of a centralized amplification type amplifier. The optical amplifier 2a is equipped with an erbium-doped fiber amplifier 25, optical isolators 20, and an optical filter 11a. The first optical isolator 20 is provided on the input side of the erbium-doped fiber amplifier 25 through a first optical coupler 10a, and the second optical isolator 20 is provided on the output side of the erbium-doped fiber amplifier 25 through a second optical coupler 10b. The optical filter 11a is provided on the output side of the optical isolator 20. The inverted passing-wavelength characteristic of the optical filter 11a is set by a control part 12a. In addition to these, parts with the same reference numerals as those described above have the same functions.

The optical isolators 20 are used for preventing relative intensity noise (RIN) degradation due to reflected light and destroy of the erbium-doped fiber amplifier 25 and are constructed so as to be detachable. Note that RIN means an index of light intensity noise (fluctuation in light intensity) which is output from an excitation laser (excitation laser 25b) provided in the erbium-doped fiber amplifier 25. It is represented by a ratio between light intensity noise per unit wavelength and average optical power that is output from an excitation laser.

The erbium-doped fiber amplifier 25 is equipped with an erbium-doped fiber 25a, an excitation laser (laser diode (LD)) 25b, and an optical coupler 25c. The excitation laser 25b is used for exciting the erbium-doped fiber 25a and outputs, for example, excitation light with a wavelength of 1.48 μm or 0.98 μm. The optical coupler 25c is a WDM coupler to input the excitation light from the excitation laser 25b, to the erbium-doped fiber 25a along with optical signals. The optical coupler 25c is provided on the input side of the erbium-doped fiber 25a by way of example. The optical coupler 25c may be provided on the output side of the erbium-doped fiber 25a, or two optical couplers may be provided on both sides of the erbium-doped fiber 25a, respectively.

Figure 3A:
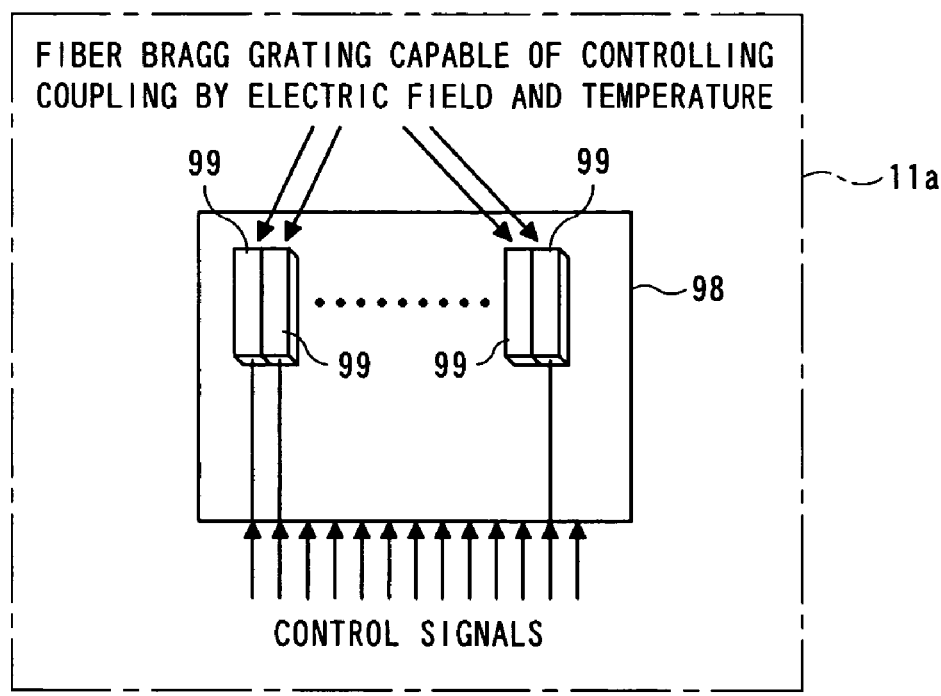
FIG. 3A is a simplified plan view showing an optical filter.

The optical filter 11a is an optical pass-band filter capable of tuning a passing-wavelength characteristic (pass-band characteristic). FIG. 3A is a simplified plan view showing the optical filter 11a. The optical filer 11a shown in the figure has a plurality of fiber Bragg gratings (FBGs) 99 for passing WDM light, which are provided in series at intervals based on a fixed optical path length. When the optical filter 11a is not being controlled, optical signals with a single wavelength, contained in WDM light, pass through separate fiber Bragg gratings 99, respectively.

Figure 3B:
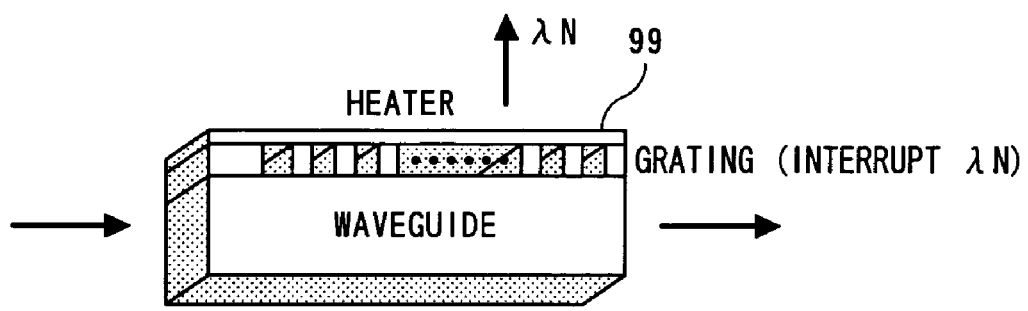
FIG. 3B is a simplified perspective view showing a fiber Bragg grating.

On the other hand, FIG. 3B is a simplified perspective view showing the fiber Bragg grating. When the optical fiber shown in the figure is being controlled, a heater, provided in each of the fiber Bragg gratings 99 through which optical signals with a single wavelength pass, is heated by a control signal from the setting part 16a.

Figure 4A:
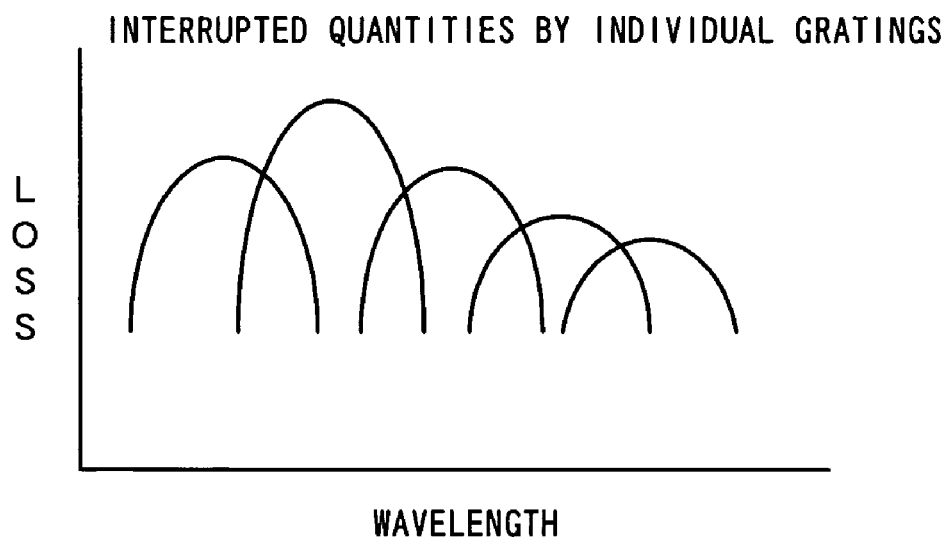
FIG. 4A is a diagram showing the loss-wavelength characteristic of fiber Bragg gratings.
Figure 4B:
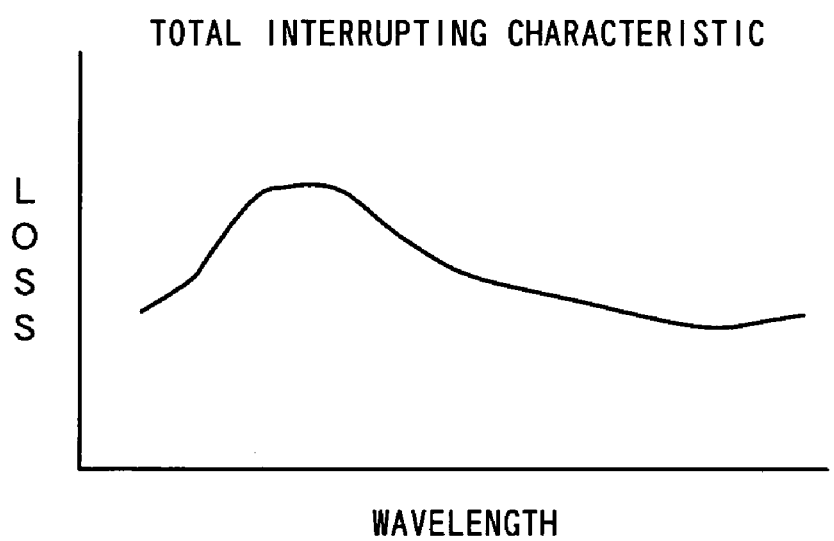
FIG. 4B is a diagram showing the total loss-wavelength characteristics of the fiber Bragg gratings.

FIG. 4A shows the loss-wavelength characteristics of the fiber Bragg gratings 99, the interrupted quantities by the fiber Bragg gratings 99 being shown. Lost wavelength light (wavelength λN where N is a natural number of 2 or greater) couples with wavelength light which has a wavelength adjacent to the wavelength λN of the lost wavelength light, and consequently, a wavelength band component with the lost wavelength λN as center is lost. The total loss-wavelength characteristic of the fiber Bragg gratings 99 is shown in FIG. 4B.

Thus, the loss of the fiber Bragg grating 99 can be adjusted by temperature. Note that the above-described characteristic of the optical filter 11a is merely an example. For instance, light with a desired wavelength can be lost by controlling the strength of an electric field.

And the control part 12a (see FIG. 2) is used for controlling the optical filter 11a.

FIG. 5 shows the control part 12a constructed in accordance with the first embodiment of the present invention. The control part 12a shown in the figure is equipped with (1) a filter control driver circuit part 97a for controlling the optical filter 11a, (2) a data line bus 97b, (3) a central processing unit (CPU) 97c, (4) a boot ROM 97d for holding procedures when booting the optical amplifier 2a, (5) a plurality of nonvolatile memories 97e for holding wavelength characteristic data as database 17, (6) a plurality of arithmetic RAMs 97f, and (7) an input-output interface 97g for inputting and outputting data between it and modules (not shown) provided outside the control part 12a. Note that the construction of the control part 12a shown in FIG. 5 is the same as those of control parts 12b and 12c provided in other embodiments and alterations to be described later.

The wavelength characteristic data held in the database 17 will hereinafter be described in further detail.

FIGS. 6A to 6D show an example of the wavelength characteristic data used in the first embodiment of the present invention. FIG. 7 is a diagram for explaining the computation of the inverted passing-wavelength characteristic used in the first embodiment of the present invention. The nonvolatile memory 97e holds both loss-wavelength characteristic data and gain-wavelength characteristic data, and the loss-wavelength characteristic data of the transmission line 18 (e.g., a single-mode fiber) consists of loss-wavelength characteristic data divided into 5000 parts. Also, the wavelength characteristic data shown in FIG. 6B is the gain-wavelength characteristic data of the gain block 14 (e.g., an erbium-doped fiber amplifier) and has an undulated portion. This curve consists of 5000 wavelength-dependent characteristic data parts. The 5000 data parts are held as a plurality of gain-wavelength characteristics (e.g., three types), with the input and output optical powers of the erbium-doped fiber amplifier 25 as parameters. Note that the dividing number 5000 depends on the performance, etc., of devices and various dividing numbers can be used.

Figure 6C:
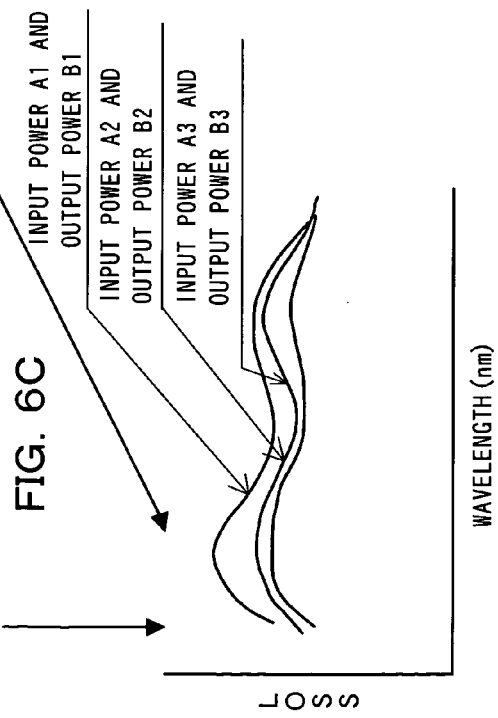
FIG. 6C is a diagram showing an example of loss-wavelength characteristic data obtained by adding the loss-wavelength characteristic data and gain-wavelength characteristic data shown in FIGS. 6A and 6B.
Figure 7:
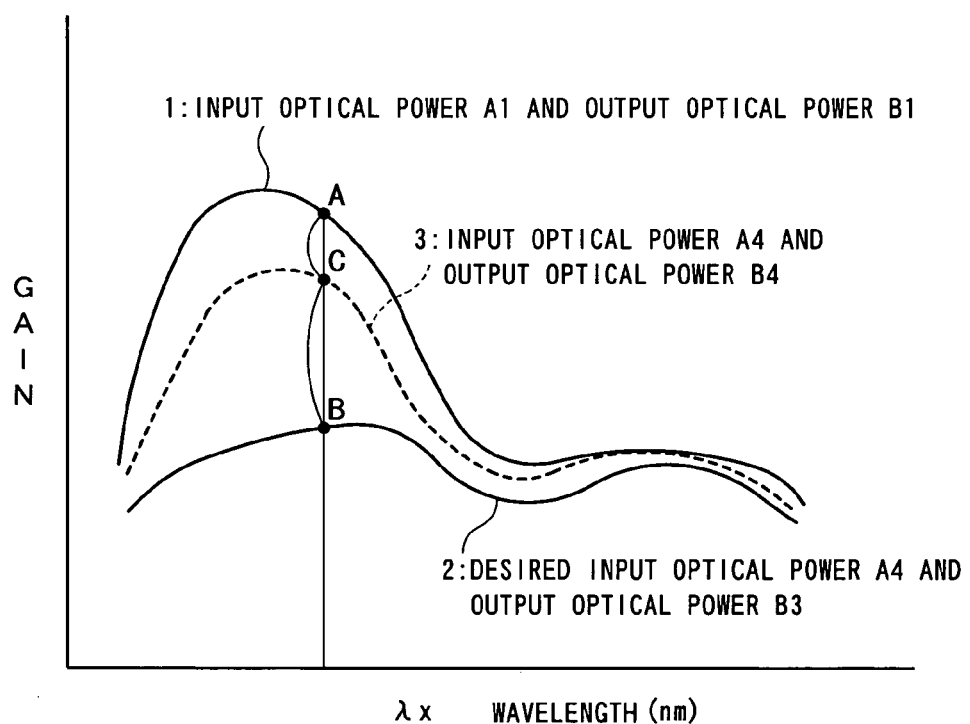
FIG. 7 is a diagram for explaining the computation of an inverted passing-wavelength characteristic used in the first embodiment of the present invention.

The wavelength characteristic data shown in FIG. 6C represents the loss-wavelength characteristic data obtained by adding the loss-wavelength characteristic data and gain-wavelength characteristic data shown in FIGS. 6A and 6B.

The arithmetic part 16 computes the gain-wavelength characteristic of an erbium-doped fiber amplifier for desired input optical power and output optical power, by interpolating the wavelength characteristic data held with optical power as a parameter, held in the database 17, for input optical power and output optical power measured by the photodiode 13, measurement part 19, etc.

FIG. 7 is a diagram for explaining the interpolation used in the first embodiment of the present invention. The curve 1 shown in the figure is a gain-wavelength characteristic when input optical power is A1 and output optical power is B1, and curve 2 is a gain-wavelength characteristic when input optical power is A3 and output optical power is B3. (It is assumed that A1>A3 and B1>B3.) A gain-wavelength characteristic between curves 1 and 2 has not been held in the database 17. If the measurement part 19 obtains input optical power A4 and output optical power B4, the arithmetic part 16 interpolates the characteristic data C for input optical power A4 and output optical power B4, based on wavelength characteristic data obtained for wavelength λX among 5000 wavelength characteristic data parts. The arithmetic part 16 obtains curve 3 representing a gain-wavelength characteristic when input optical power is A4 and output optical power is B4, by interpolating 5000 wavelength characteristic data parts between curves 1 and 2.

Figure 6D:
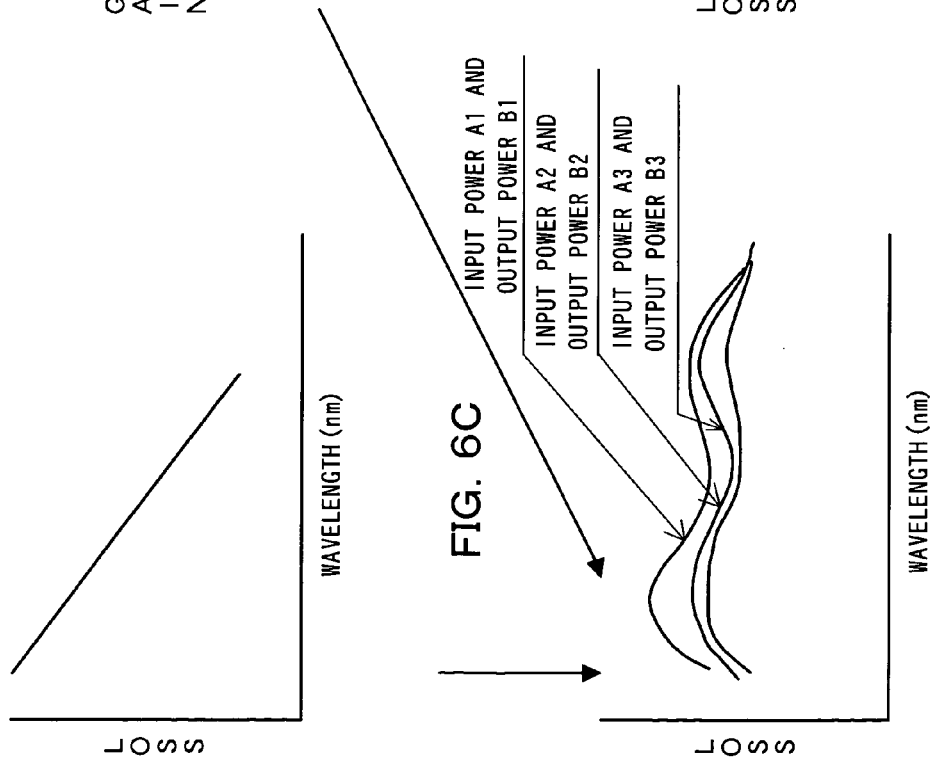
FIG. 6D is a diagram showing an example of inverted passing-wavelength characteristic data.

In the computation of a control value for the optical filter 11a, the arithmetic part 16 obtains the loss-wavelength characteristic data shown in FIG. 6C, by adding the gain-wavelength characteristic data of the erbium-doped fiber amplifier 25 obtained by interpolation, and the loss-wavelength characteristic data shown in FIG. 6A. Then, the arithmetic part 16 computes the inverse of the loss-wavelength characteristics shown in FIG. 6C. The computed inverted loss-wavelength characteristics are shown in FIG. 6D by way of example.

More specifically, when the value of the computed wavelength characteristic data is Gi (dB), a control target value Li for the optical filter 11a is Li that satisfies Gi(dB)+Li(dB)=0. Furthermore, an actual control value is a value defined by (L–Cont–I=Li+Lm), when min{|Li|}=Lm is defined ("|Li|" represents absolute value). And the control part 12 smooths the wavelength characteristic of an optical signal that is output from the optical amplifier 2a, by setting the control value L–Cont–I to the optical filter 11a.

Unless otherwise noted, this method of computation is likewise utilized in other embodiments and alterations to be described later.

In the case of computing the total wavelength characteristic with the above-described construction, the arithmetic part 16 obtains the given types of transmission lines 18 on the input and output sides and transmission line lengths of input and output fibers (transmission lines 18), and the power of input monitoring light and power of output monitoring light, and also obtains the gain-wavelength characteristic of the gain block 14 and the loss-wavelength characteristics of the transmission lines 18 from the database 17. And the control part 12a sets the passing-wavelength characteristic of the optical filter 11a to the inverse of the computed passing-wavelength characteristic, and the optical filter 11a is booted after the inverted passing-wavelength characteristic has been set. After the optical filter 11a has been booted, the control part 12a suitably controls the pass-band characteristic of the optical filter 11a to a proper pass-band characteristic, using the results of measurement of the monitored values of the output optical power and input optical power. In this way, the pass-band characteristic of the optical filter 11a is optimized.

The inverted pass-band characteristic data can be set to the optical filter 11a at various timing. As an example, it can be set somewhere in the control sequence to be performed by the control part 12.

In the case where the inverted pass-band characteristic data is set before the optical amplifier 2a is booted, the control part 12a first judges the presence or absence of input light. If light has been input, the optical amplifier 2a is booted. And the control part 12a judges whether the output optical power is stable. When the output optical power is stable, the measurement part 19 measures the input optical power and output optical power. Based on the measured input optical power and output optical power, the arithmetic part 16 computes a pass-band characteristic for the optical filter 11a. And the control part 12a sets the inverted pass-band characteristic of the optical filter 11a by the setting part 16a.

On the other hand, in the case where the inverted pass-band characteristic data is set after the optical amplifier 2a has been booted, the control part 12a judges whether the output optical power is stable, without judging the presence or absence of input light. The input optical power and output optical power are measured, a computation by the arithmetic part 16 is made, and the setting of the optical filter 11a is performed.

Therefore, the setting of the optical filter 11a can be performed even in the case of a continuously booted state.

Thus, the optical amplifier 2a can smooth the wavelength characteristic of the output light without employing an additional component such as an optical spectrum analyzer, etc., and can suppress redundant excitation light power. As a result, the dummy light required when tuning the pass band with an optical spectrum analyzer becomes unnecessary.

Furthermore, a control target value at the time of the boot of the optical filter 11a can be properly set. Therefore, for instance, the time from the boot of the optical transmission system 1a to the start of signal communication with distant stations can be shortened.

In this way, the optical transmission system 1a can prevent a control system (e.g., an optical spectrum analyzer) from being disturbed when increasing or decreasing the number of system components and can also prevent an adverse influence over optical signals having wavelengths other than the wavelengths related to the increase or decrease of system components. Thus, system operation can be stabilized.

(B) Description of the Second Embodiment

In a second embodiment of the present invention, a description will be given in the case where the gain block 14 (see FIG. 1) is constructed of a Raman fiber amplifier.

Figure 8:
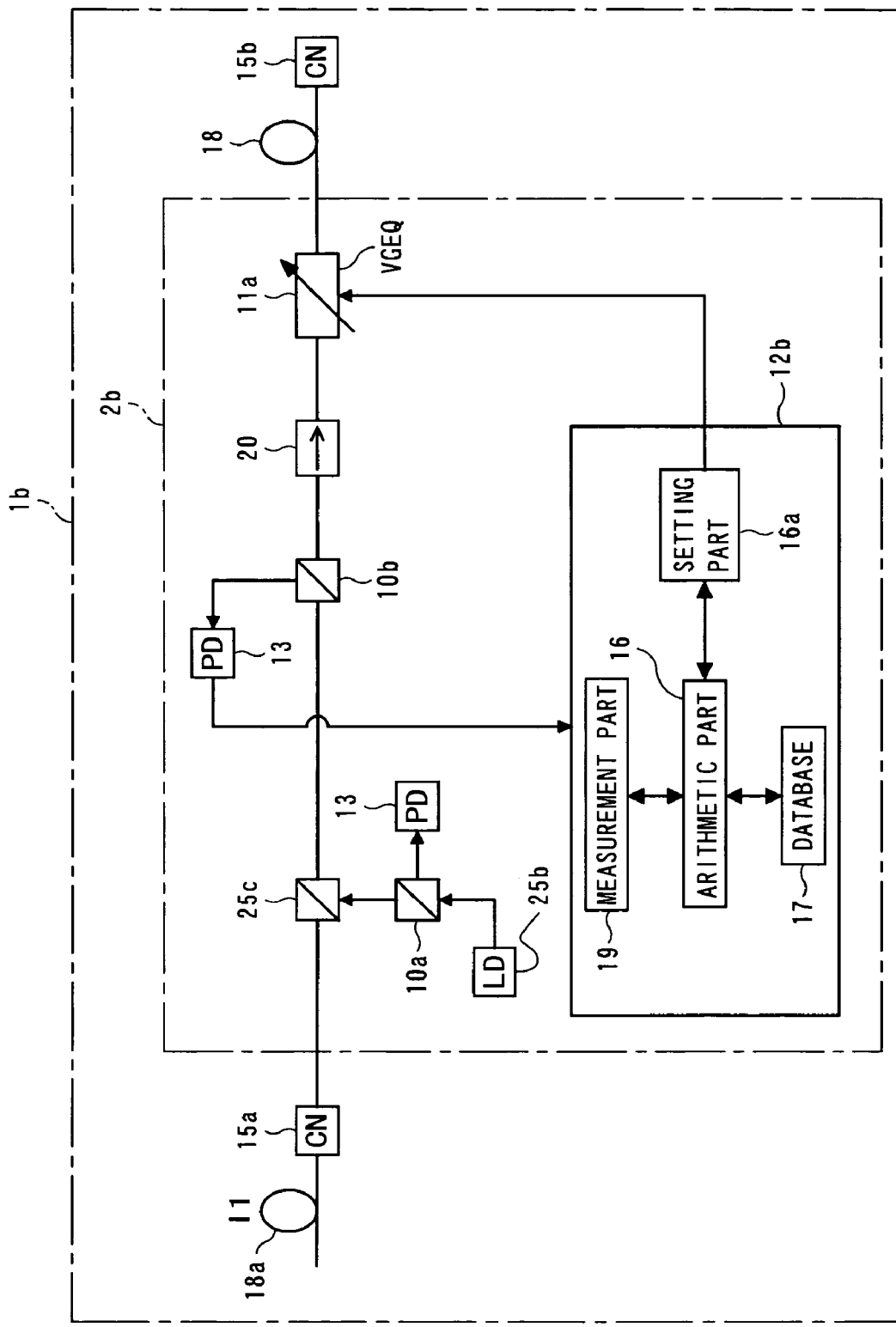
FIG. 8 is a diagram showing an optical WDM transmission system constructed in accordance with a second embodiment of the present invention.

FIG. 8 is a diagram showing an optical WDM transmission system constructed in accordance with the second embodiment of the present invention. The optical transmission system 1b shown in the figure is used for transmitting WDM light and is equipped with a transmission line (Raman fiber amplifier) 18a having a Raman amplification function, and an optical amplifier 2b which outputs excitation light and monitors optical power. The control part 12b of the optical amplifier 2b computes the passing-wavelength characteristic of an optical filter 11a and sets the inverse of the computed passing-wavelength characteristic to the optical filter 11a. The control part 12b is equipped with a measurement part 19, a database 17, an arithmetic part 16, and a setting part 16a.

The measurement part 19 is used for measuring the power of excitation light on the input side of the gain block 14. The gain block 14 performs amplification using a transmission line 18a capable of Raman amplification. After an optical filter 11a has been booted, the setting part 16a sets a passing-wavelength characteristic, based on the excitation light power of the transmission line 18a capable of Raman amplification. Therefore, before and after the optical filter 11a is booted, quick wavelength characteristic control and efficient optical amplification become possible.

The database 17 holds Raman efficiency data for each excitation wavelength and loss-wavelength characteristic data for transmission lines 18, 18a. This database 17 holds a loss-wavelength characteristic for each of the types of transmission lines 18, 18a and also holds gain-wavelength characteristics with excitation light power as a parameter. The gain-wavelength characteristics are held so as to correspond to different types of optical amplifiers 11a, respectively.

The gain-wavelength characteristic is determined by the values of loss-wavelength characteristics per unit distance for a single-mode fiber and a nonzero dispersion-shifted fiber, and also by excitation light power for Raman amplification. That is, the database 17 holds a wavelength characteristic corresponding to the excitation light power of the transmission-line amplification type transmission line 18*a*. And the arithmetic part 16 computes an inverted passing-wavelength characteristic, based on the wavelength characteristics respectively corresponding to the excitation light power held in the database 17 and excitation light power measured by the measurement part 19. In this way, loss-wavelength characteristics can be easily obtained regardless of the type of transmission line 18 used. Also, the optical filter 11*a* can be controlled both when it is booted and after it has been booted.

On the other hand, the gain block 14 performs amplification using the transmission line 18*a* capable of Raman amplification, and after the optical filter 11*a* has been booted, the setting part 16*a* sets a passing-wavelength characteristic, based on the excitation light power of the transmission line 18*a* capable of Raman amplification. In this way, wavelength characteristics can be properly controlled before and after the optical amplifier is booted.

Furthermore, the Raman amplifier 18*a* is a fiber that produces a sufficient Raman effect, and serves as the gain block 14 (see FIG. 1). The gain profile of this Raman amplifier 18*a* is determined by the Raman efficiency of the transmission line 18*a* and a plurality of excitation lasers that output excitation light of different wavelengths. With respect to Raman amplification fibers, dispersion-compensating fibers are employed in the case of centralized Raman amplification. In FIG. 8, parts with the same reference numerals as those described above have the same functions.

With the above-described construction, the arithmetic part 16 computes a gain-wavelength characteristic for the gain block 14 and a loss-wavelength characteristic for the transmission line 18*a* from data held in the database 17, by using the excitation light power value measured by the measurement part 19, the given type and length of input-side transmission line 18*a*, and a set target output value. And the arithmetic part 16 obtains a control value for the optical filter 11*a*.

The control part 12*b* sets an inverted passing-wavelength characteristic to the optical filter 11*a*. After the inverted passing-wavelength characteristic has been set to the optical filter 11*a*, it is booted. After the optical filter 11*a* has been booted, the control part 12*b* suitably controls the pass-band characteristic of the optical filter 11*a* to a proper pass-band characteristic, using the results of measurement of the monitored values of the excitation light power and input optical power. In this way, the pass-band characteristic of the optical filter 11*a* is optimized.

Thus, the optical amplifier 2*b* can smooth the wavelength characteristic of the output light without employing an additional component such as an optical spectrum analyzer, etc., and can suppress redundant excitation light power. Also, dummy light becomes unnecessary and it becomes possible to reduce the prices of the optical amplifier 2*b* and optical transmission system 1*b*. Moreover, for instance, the time from the boot of the optical transmission system 1*b* to the start of the signal communication between repeater stations can be shortened.

In this way, the optical transmission system 1*b* can prevent a control system from being disturbed when increasing or decreasing the number of system components. Thus, the operation of the optical transmission system 1*b* can be stabilized.

(C) Description of the Third Embodiment

A third embodiment is an alteration of the first and second embodiments. In the optical transmission system 1*a* or 1*b* with the optical amplifier 2*a* or 2*b*, the type and length of input-side transmission line 18 used are obtained from upstream supervisory (SV) light. This SV light contains information about the type of transmission line 18, transmission line length, etc. The SV light is an optical signal with a wavelength differing from wavelengths allocated to WDM light.

Figure 9:
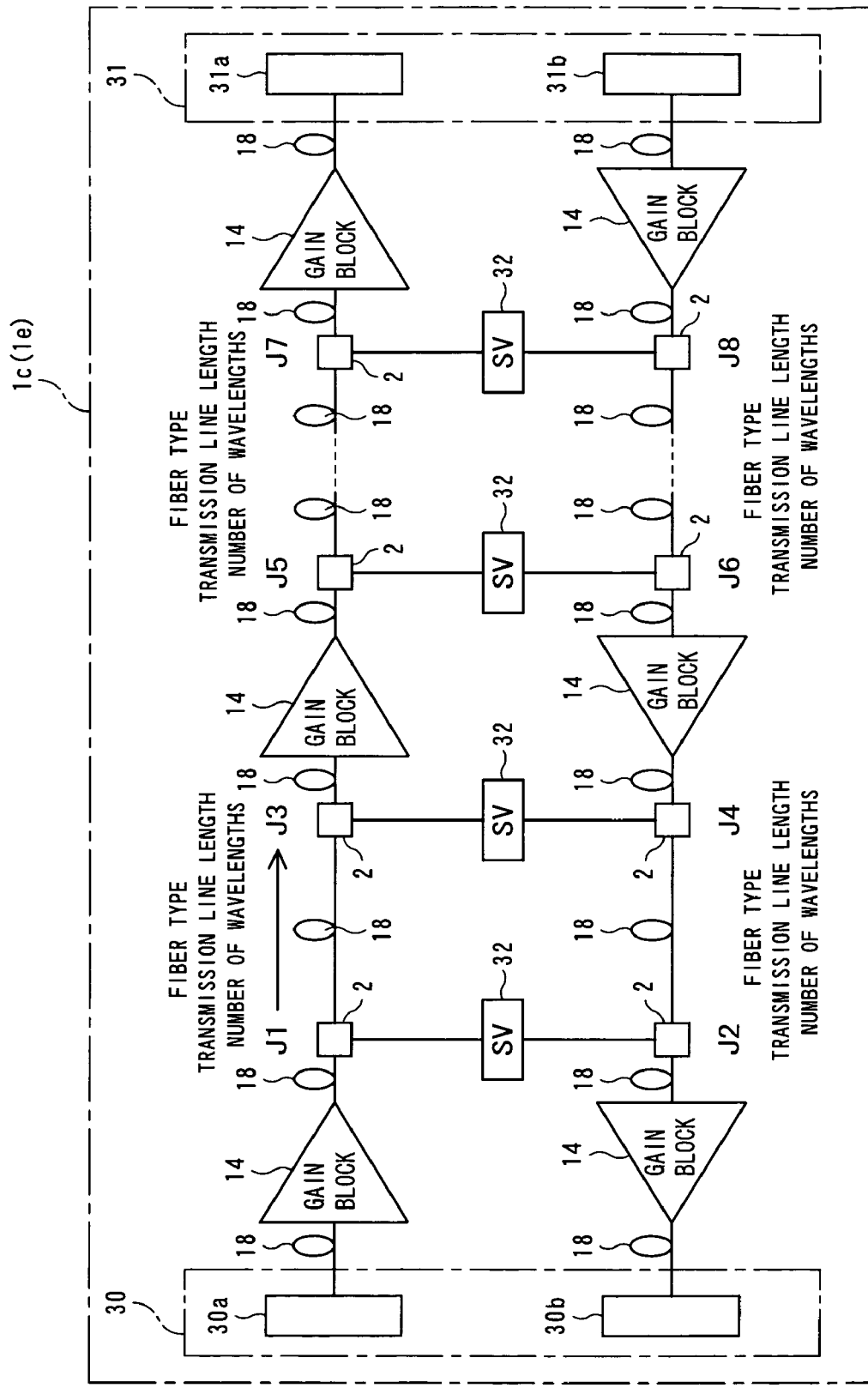
FIG. 9 is a simplified block diagram showing an optical transmission system constructed in accordance with a third embodiment of the present invention.

FIG. 9 shows an optical transmission system constructed in accordance with the third embodiment of the present invention. The optical transmission system 1*c* shown in the figure is equipped with optical WDM terminal stations (hereinafter referred to as terminal stations) 30, 31, again block 14, optical couplers J1 to J8 contained in an optical amplifier 2*a* (or 2*b*), and a coupler 32. Note that optical signals are transmitted in a first direction from the first terminal station 30 to the second terminal station 31, or a second direction from the second terminal station 31 to the first terminal station 30.

Each repeater station, connected on the transmission line 18, transfers the type and length of output-side transmission line 18 to a downstream station (including a terminal station), using SV light. The downstream station tunes the wavelength characteristic of an optical filter 11*a* according to the information inserted in the SV light. Note that the gain block 14 is constructed of an erbium-dope fiber amplifier or Raman fiber amplifier.

The terminal stations 30, 31 are used for terminating optical signals and are equipped with transmitters 30*a*, 31*b* which transmit SV light, and receivers 30*b*, 31*a* which receive SV light. The coupler 32 extracts SV light from the transmission line 18 in the first direction and outputs SV light onto the transmission line 18 in the second direction.

Therefore, the terminal station 30 transmits SV light containing information about the type and length of transmission line 18, to the adjacent optical amplifier 2*a* (or 2*b*), and the SV light is branched by the coupler 32. The branched SV light is converted into electronic form by a photodiode 13, and the information contained in the converted electrical signal is decoded by a reception processing part (not shown). In other words, the coupler 32, photodiode 13, and reception processing part as a whole serve as an acquiring part (32, 13). The acquiring part (32, 13) obtains the type and length of transmission line 18 connected to the gain block 14, from the upstream SV light or a device monitoring system that monitors the status of transmission (see FIG. 12 to be described later). In this way, updated information is efficiently utilized.

Also, the arithmetic part 16 of the optical amplifier 2*a* (or 2*b*) computes an inverted passing-wavelength characteristic in the first direction, based on the data contained in received light, and the setting part 16*a* sets the inverted passing-wavelength characteristic in the first direction of the transmission line 18, based on data held in the database 17.

The optical amplifiers 2*a* (or 2*b*) insert information about the type and length of transmission line 18 connected to the output side thereof, into SV light and transmits it to downstream stations. The downstream stations adjust the value of the output optical power, based on the information contained in SV light transmitted from upstream stations. And each downstream station inserts information about the type and length of transmission line 18 into SV light and transmits the SV light to the adjacent downstream station. The SV light is received and processed by the receiving part 31*a* of the terminal station 31. The same is also true of the transmission in the second direction.

Furthermore, each repeater station connected on the transmission line 18 decodes optical signals transmitted from the upstream side, and inserts information about the type and length of transmission line 18 into SV light and transmits it to the downstream side.

Thus, the data required for computing a loss-wavelength characteristic for the optical filter 11a can be acquired from various directions, so the transmission system is less susceptible to external disturbance.

Note that the optical transmission system 1e shown in FIG. 9 will be described in a fifth embodiment that is to be described later.

With the above-described construction, a passing-wavelength characteristic control method is carried out by the optical transmission system 1c.

Figure 10:
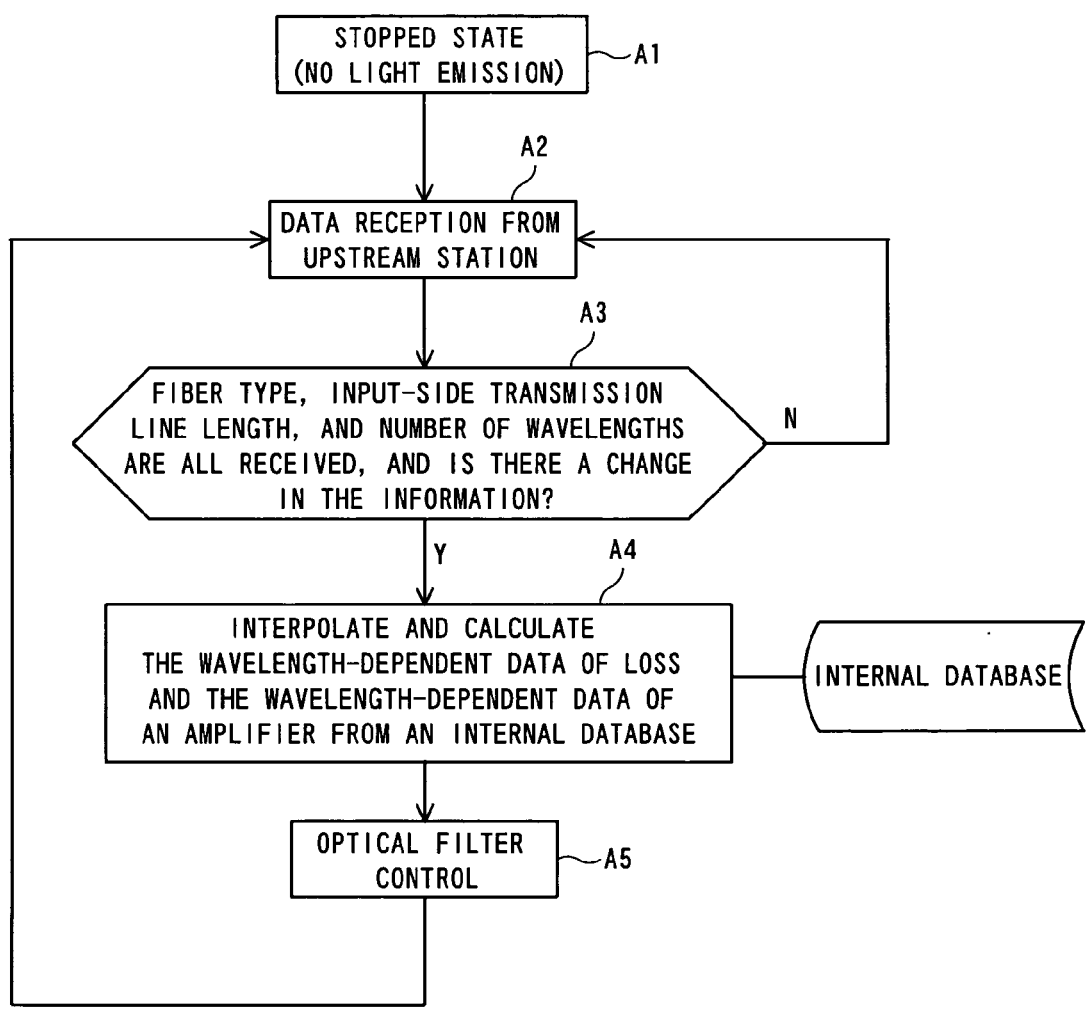
FIG. 10 is a flowchart for explaining how a passing-wavelength characteristic is controlled in accordance with the third embodiment of the present invention.

FIG. 10 shows a flowchart for explaining the passing-wavelength characteristic of an optical filter is controlled in the third embodiment of the present invention. The optical amplifier 2 stops an excitation laser 25b from emitting light during the time that SV light is not input from an upstream station (step A1). If SV light is received from an upstream station, information contained in the SV light is decoded (step A2). In step A3, if the type of transmission line 18, the input-side transmission line length, etc., are all received, the acquiring part (32, 13) judges whether the information has been changed. When there is no change, the reception process in step A2 is performed again. On the other hand, when there is a change in the information, the arithmetic part 16 computes wavelength characteristic data for the optical amplifier 2 by interpolation, using the loss-wavelength characteristic data held in the database 17 of the optical amplifier 2 (step A4). Also, the setting part 16a sets the computed wavelength characteristic data to the optical filter 11a, whereby the optical filter 11a is controlled (step A5).

Thus, the third embodiment similarly has the same effects as those obtained by the first embodiment and second embodiment.

Figure 11:
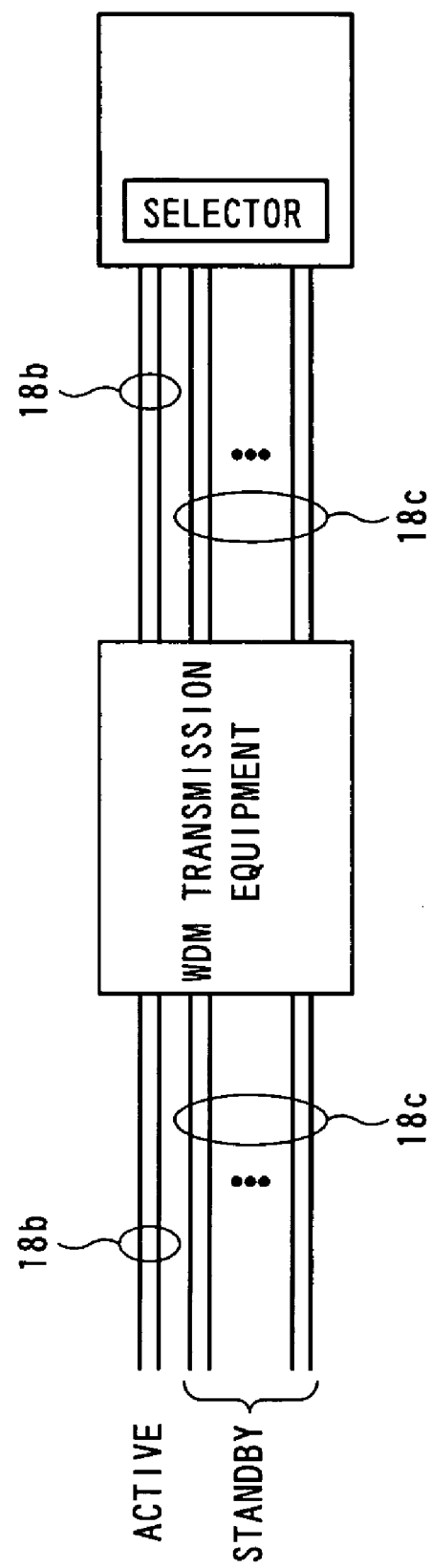
FIG. 11 is a diagram for explaining a redundant system.

Also, the passing-wavelength characteristic control method in the optical transmission system 1c explains operation in the case of a 1:M redundant system where a single station is connected on a plurality of transmission lines 18 (M represents a natural number of 2 or greater). As an example, as shown in FIG. 11, a redundant system is constructed of an active transmission line 18b which is transmitting optical signals, and a plurality of standby transmission lines 18c which are used when the operation of the active transmission line 18b is stopped for line cutting, maintenance, etc.

In the above-described construction, when line cutting or other fault occurs in the active transmission line 18b, a downstream station switches the active transmission line 18b to one of the standby transmission lines 18b, using a selector provided in the reception processing part (not shown). And the downstream station that switched the active transmission line 18b to the standby transmission line 18c decodes information about the type and length of transmission line 18 from the upstream station corresponding to the transmission line 18 at 1:1, and controls the passing-wavelength characteristic of the optical filter 11a.

Therefore, when the wavelength characteristics of light output from repeater stations are smoothed, and interrupting transfer is needed, the optical transmission system 1c can quickly return to normal operation.

(D) Description of the Fourth Embodiment

An optical transmission system in a fourth embodiment is provided with a network management system (NMS), which is connected with stations. This NMS sends information about the type and length of transmission line 18 connected to the output side of each station (including a single station), to each station. The arithmetic part 16 of each station computes the wavelength characteristic of an optical filter 11a, based on the sent information. And the computed wavelength characteristic is set to the optical filter 11a of each station, whereby the wavelength characteristic of the optical filter 11a is tuned. The NMS can sent information to both an erbium-doped fiber amplifier and a Raman fiber amplifier.

Figure 12:
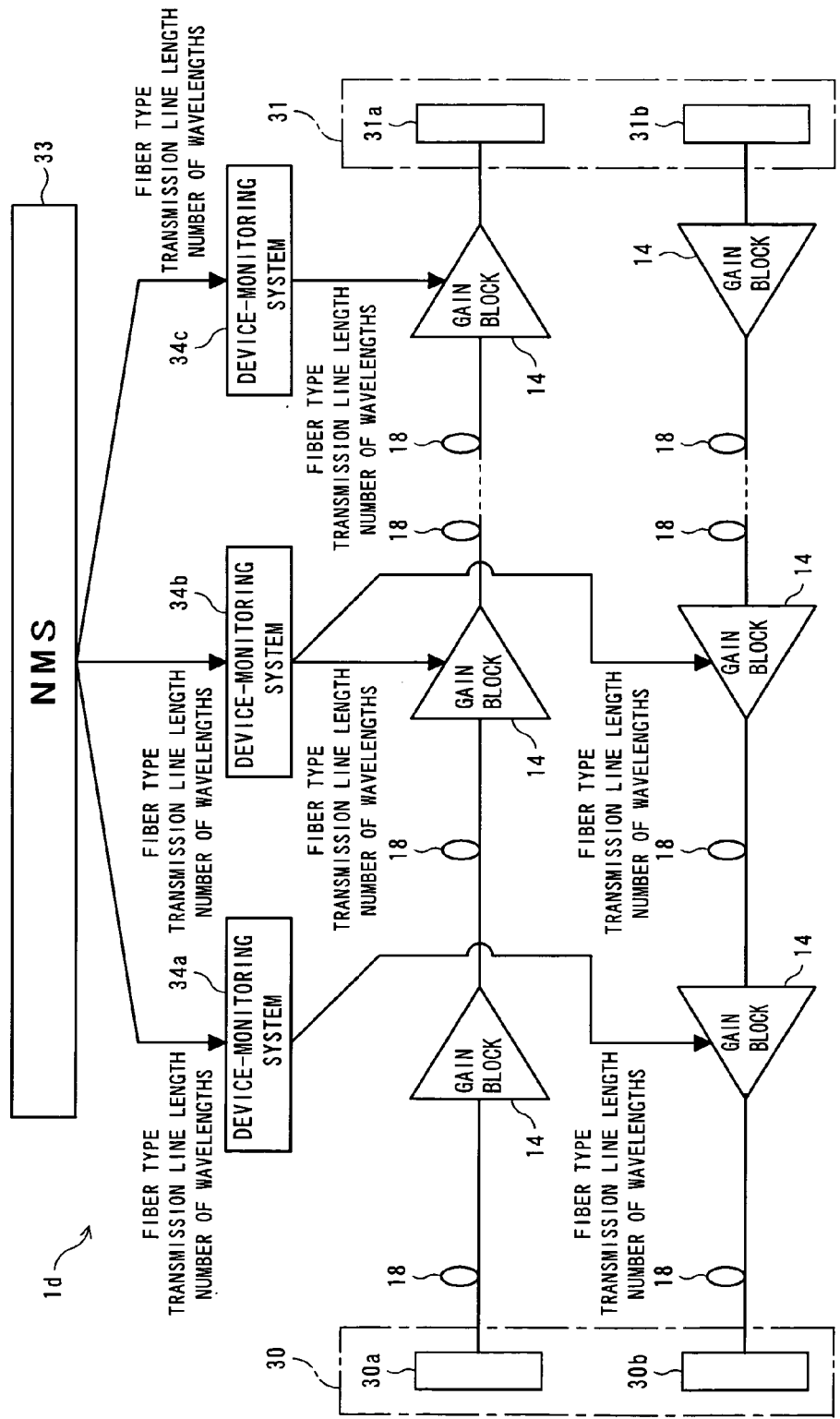
FIG. 12 is a simplified block diagram showing an optical transmission system constructed in accordance with a fourth embodiment of the present invention.

FIG. 12 shows an optical transmission system constructed in accordance with the fourth embodiment of the present invention. The optical transmission system 1d shown in the figure is provided with an NMS 33 and a plurality of device monitoring systems 34a to 34c. The NMS 33 is used for controlling traffic and is usually provided in a place separate from stations so it can monitor the statuses of transmission of the stations collectively. This monitoring function is exhibited by the control layer of a monitoring software application that primarily monitors a higher layer side.

Also, gain blocks 14 are constructed of erbium-doped fiber amplifiers and connected in multiple stages through transmission lines 18. Note that an optical amplifier 2 in which the gain blocks 14 are provided is not shown.

Further, the device monitoring systems 34a to 34c monitor the transmission state of each optical amplifier 2 (gain block 14), send that transmission state to the NMS 33, and set the type and length of transmission line 18, etc., to each optical amplifier 2. These device monitoring systems 34a to 34c can perform the setting of an optical filter 11a (not shown) individually in the first direction and second direction of the transmission line 18. For example, the first device monitoring system 34a performs the setting of the corresponding gain block 14 (or the optical amplifier 2) in the second direction. The second device monitoring system 34b performs the setting of the corresponding gain block 14 (or the optical amplifier 2) in the first direction and second direction. Similarly, the third device monitoring system 34c performs the setting of the corresponding gain block 14 (or the optical amplifier 2) in the second direction.

Thus, the gain blocks 14 as repeater stations receive the type and length of transmission line 18, etc., from the device monitoring systems 34a to 34c. The device monitoring systems 34a to 34c obtain information about the type of transmission line 18, etc., from the NMS 33.

Also, the arithmetic part 16 computes an inverted passing-wavelength characteristic for the first direction side, based on data contained in received light. The setting part 16a sets the inverted passing-wavelength characteristic to a part on the first direction side of transmission line 18, based on data held in the database 17. This arithmetic part 16 computes an inverted passing-wavelength characteristic for the first direction side, based on data from the self-station. The setting part 16a sets the inverted passing-wavelength characteristic to a part on the first direction side of transmission line 18, based on data held in the database 17.

With the above-described construction, the NMS 33 and device monitoring systems 34a to 34c control the corresponding optical amplifiers 2.

Figure 13:
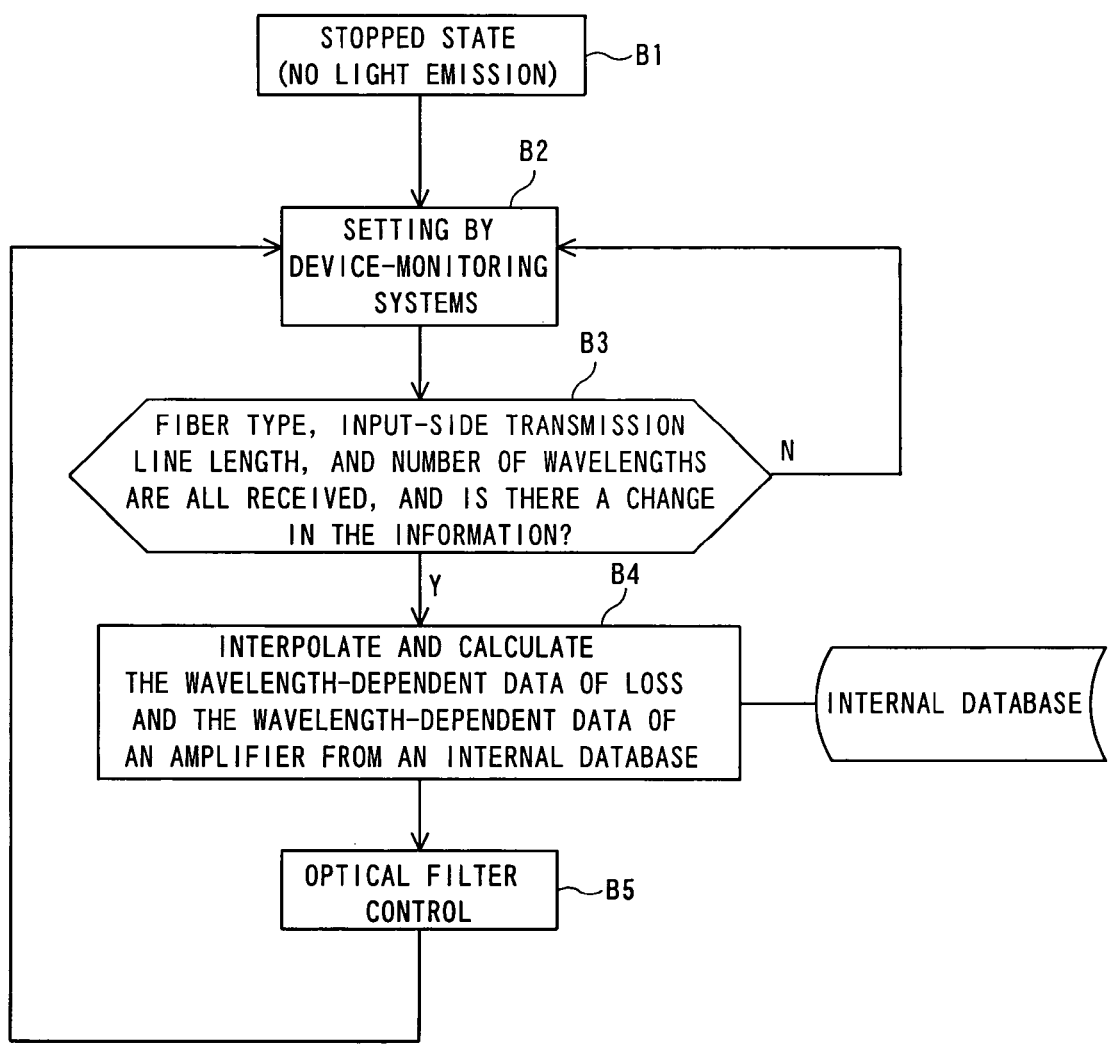
FIG. 13 is a flowchart for explaining how a passing-wavelength characteristic is controlled in accordance with the fourth embodiment of the present invention.

FIG. 13 shows a flowchart for explaining how the passing-wavelength characteristic of an optical filter 11a is controlled in accordance with the fourth embodiment of the present invention. The optical amplifier 2 stops an excitation laser 25c from emitting light (step B1). In the stopped state, if the type of transmission line 18, etc., are set by the device monitoring system 34a (step B2), an acquiring part (32, 13) judges whether the type of transmission line 18, etc., have all been received, and judges whether the information has been changed (step B3). When there is no change, step B2 is performed again. On the other hand, when there is a change in the information, the arithmetic part 16 computes wavelength characteristic data for the optical amplifier 2 by interpolation, using the loss-wavelength characteristic data held in the internal database 17 (step B4). Also, the setting part 16*a* sets the computed wavelength characteristic data to the optical filter 11*a*, whereby the optical filter 11*a* is controlled (step B5).

Therefore, an upstream station previously takes the loss-wavelength characteristic after transmission into consideration, adds a different weight to loss-wavelength characteristic data for each wavelength, and transmits that loss-wavelength characteristic data to a downstream station.

Conventional downstream stations are operated so as to improve a signal-to-noise (SN) ratio for the most degraded wavelength of the wavelengths (channels) contained in transmitted light. On the other hand, in the present invention, the most degraded wavelength is not improved, but SN ratios are improved on an average, so a downstream station can obtain a better transmission characteristic than amplifying optical signals whose receiving level has not been managed at a downstream station.

Note that in the fourth embodiment, the gain block 14 can be constructed of a Raman fiber amplifier. The operation is performed along the same flowchart as that shown in FIG. 13, so a description is omitted for avoiding redundancy.

The present invention is also applicable to the three following alterations. These alterations can be constructed by employing both an erbium-doped fiber amplifier and a Raman fiber amplifier.

As the first alteration, repeater stations control the loss-wavelength characteristic of transmission line 18 so as to compensate transmission-side transmission line 18. Also, information about output-side transmission line 18 can also be set by employing information inserted in SV light, transmitted from the device monitoring systems 34*a* to 34*c*.

As the second alteration, repeater stations control the loss-wavelength characteristic of transmission line 18 so as to compensate transmission-side transmission line 18. Also, information about output-side transmission line 18 can also be set by employing information inserted in SV light, transmitted from a distant station arranged downstream.

As the third alteration, repeater stations can set the type and length of transmission line 18, using information inserted in SV light transmitted from an upstream station.

(E) Description of the Fifth Embodiment

In the fifth embodiment of the present invention, gain blocks 14 are constructed of rare earth-dope fiber amplifiers that make gain constant and are connected in two or more stages.

Figure 14:
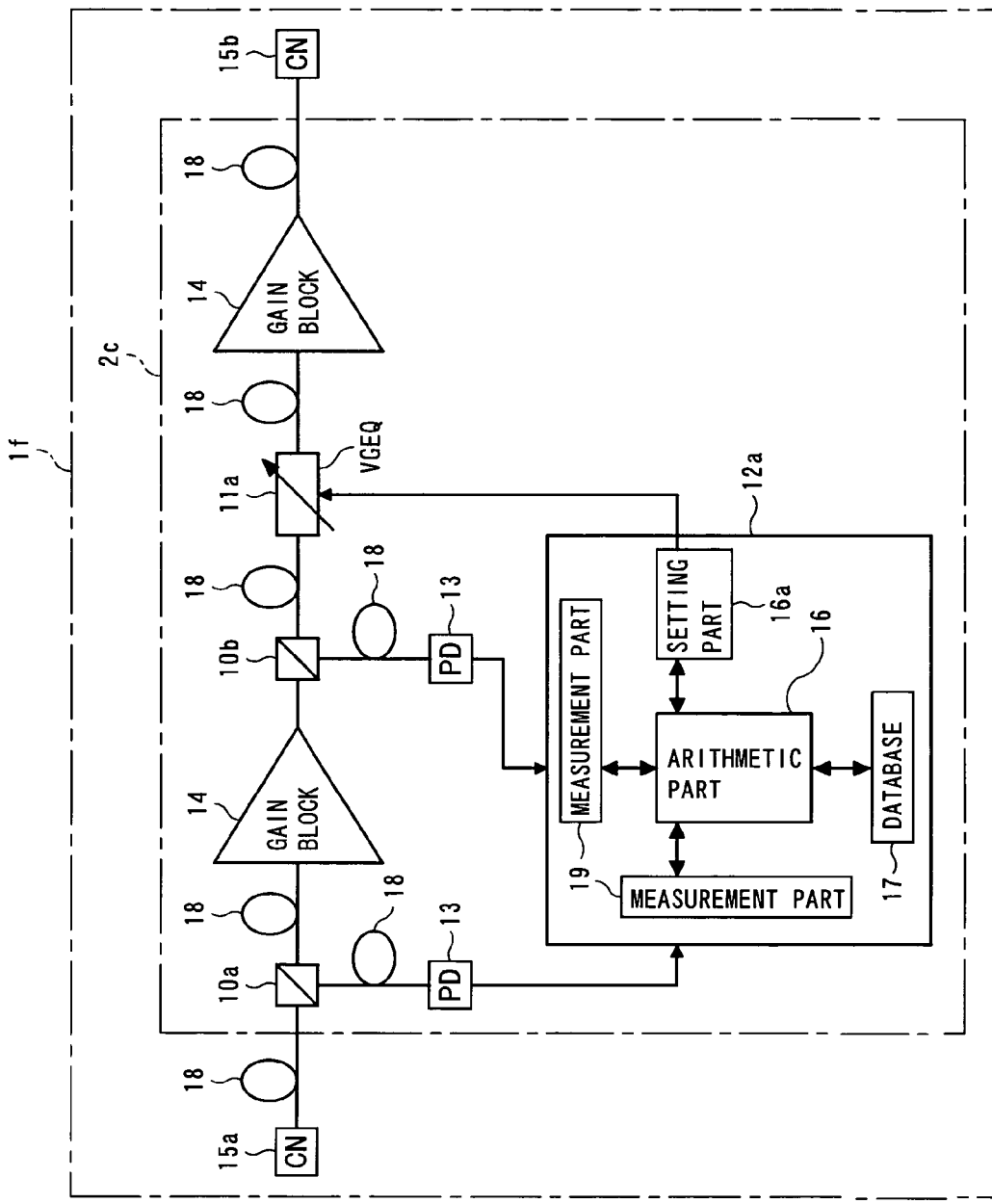
FIG. 14 is a diagram for explaining the principle of operation of an optical transmission system constructed in accordance with a fifth embodiment of the present invention.

FIG. 14 shows the principle of operation of an optical transmission system constructed in accordance with the fifth embodiment of the present invention. The optical transmission system 1*f* shown in the figure is equipped with an optical amplifier 2*c* for amplifying WDM light that passes through a transmission line 18. This optical amplifier 2*c* has gain blocks 14 of two stages. These gain blocks 14 are used for amplifying WDM light and constructed of erbium-doped fiber amplifiers. Note that the gain blocks 14 may be constructed of Raman fiber amplifiers. Also, the gain blocks 14 are not limited to 2 stages. Gain blocks 14 of two or more stages may be connected.

An optical filter 11*a* is tunable in wavelength characteristic and provided between gain blocks 14 of two stages.

An arithmetic part 16 computes an inverted passing-wavelength characteristic so as to make the gain of a centralized amplification type transmission line constant.

Note in FIG. 14 that parts with the same reference numerals as those described above have the same functions.

With the above-described construction, the arithmetic part 16 computes the inverted passing-wavelength characteristic of the optical filter 11*a*, using data held in a database 17. The setting part 16*a* sets the computed inverted passing-wavelength characteristic to the optical filter 11*a* and boots the optical amplifier 2*c*. After the optical amplifier 2*c* has been booted, the arithmetic part 16 measures the monitored values of the output optical power and input optical power. Based on the results of measurement and data held in the database 17, a theoretically proper pass-band characteristic is computed. The computed pass-band characteristic is set to the optical filter 11*a*.

Thus, the pass-band characteristic of the optical filter 11*a* is optimized. Also, the optical filter 11*a* can have proper pass-band characteristics before and after it is booted.

Furthermore, erbium-doped fiber amplifiers 25 of saturated-state operation are connected in multiple stages, so desired gain is obtained. A fluctuation in a wavelength characteristic such as a noise figure or factor (NF) can be reduced in the case where input optical power has fluctuated.

Next, with reference to FIG. 15, a description will be given of a passing-wavelength characteristic control method in the case where gain blocks 14 are constructed of erbium-doped fiber amplifiers.

Figure 15:
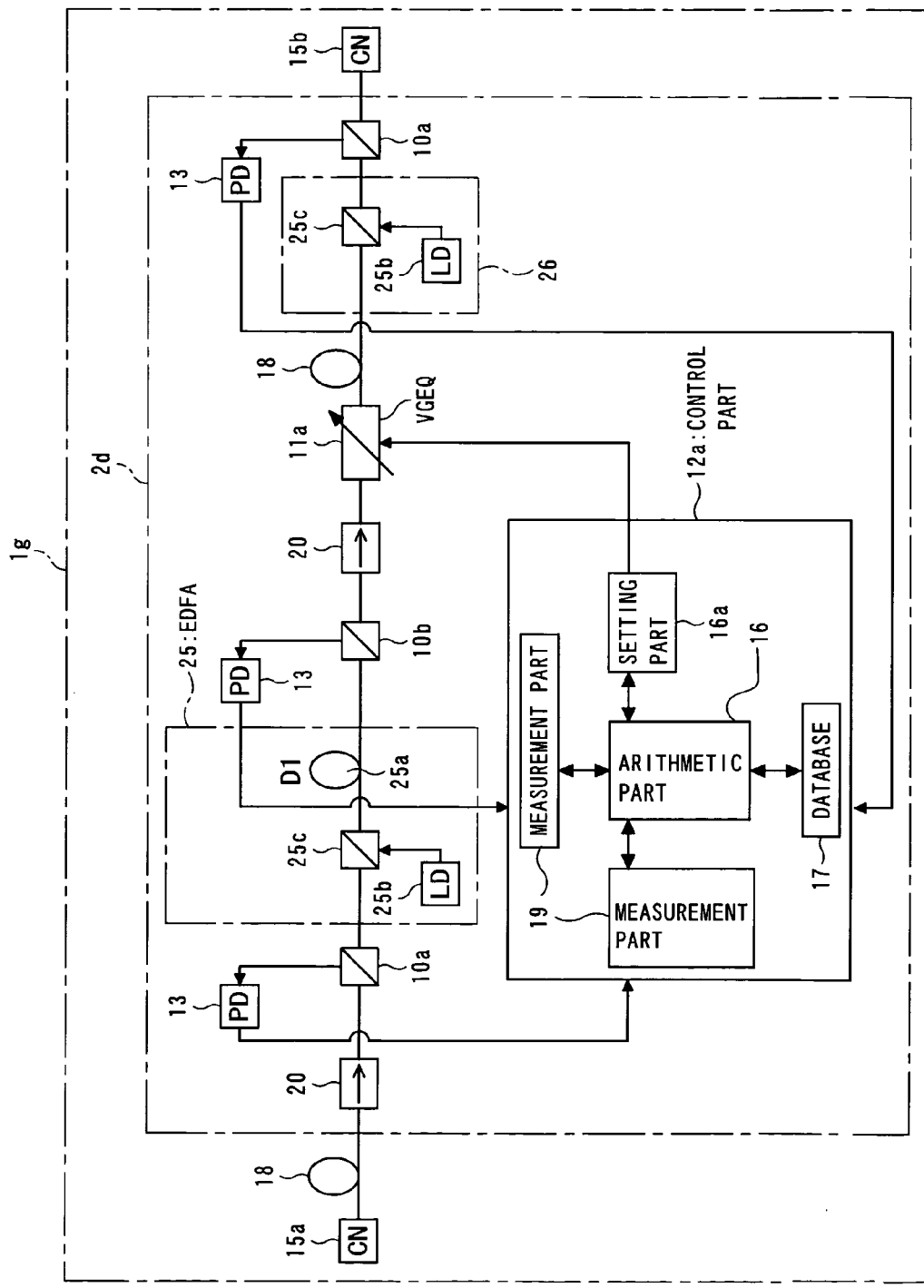
FIG. 15 is a simplified block diagram showing the optical transmission system constructed in accordance with the fifth embodiment of the present invention.

FIG. 15 shows the optical transmission system constructed in accordance with the fifth embodiment of the present invention, and the optical transmission system shown in the figure is an embodiment example of the optical transmission system If shown in FIG. 14. In an optical amplifier 2*d* shown in FIG. 15, the output side of an optical filter 11*a* is connected to a gain block 26, which has an excitation laser 25*b* and an optical coupler 25*c*. An optical signal from the gain block 26 is branched for monitoring. The branched light is input to a control part 12*a*. Note in FIG. 15 that parts with the same reference numerals as the above-described reference numerals have the same functions. Also, the optical amplifier 2*d* may have gain blocks 26 of two or more stages.

Therefore, in the optical coupler 25*c* of the gain block 26, the excitation light output by the excitation laser 25*b* is coupled with the output light of the optical filter 11*a*. The coupled optical signal is transferred to a core network 15*b*. Also, the light branched from the output light of the gain block 26 is converted into an electrical signal, which is input to the control part 12*a*. In the control part 12*a*, an inverted passing-wavelength characteristic is set to the optical filter 11*a*.

Thus, wavelength characteristic data can be similarly stabilized in the case where gain blocks 26 are connected in a plurality of stages.

(F) Description of the Sixth Embodiment

Figure 16:
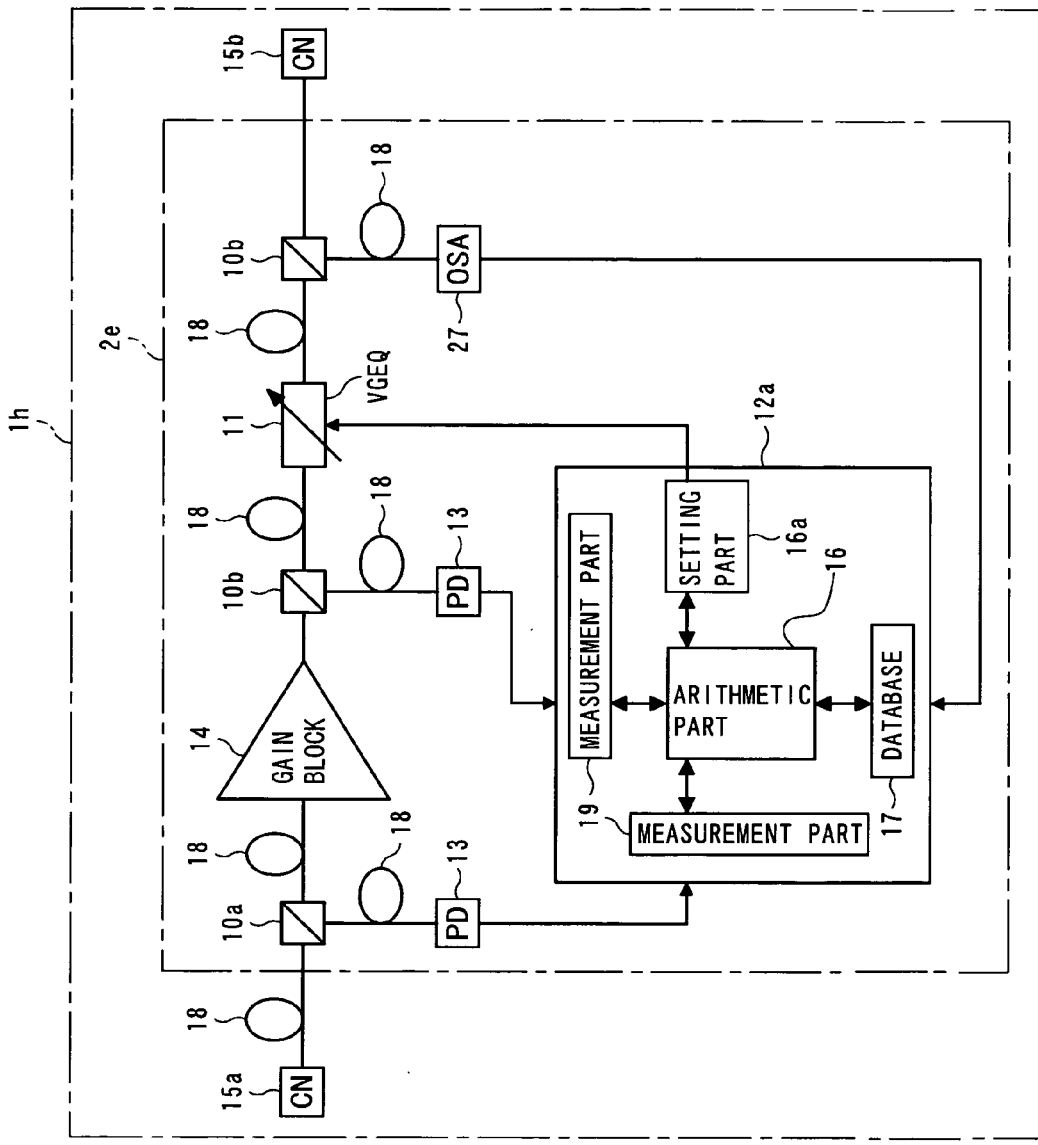
FIG. 16 is a diagram for explaining the principle of operation of an optical transmission system constructed in accordance with a sixth embodiment of the present invention.
Figure 17:
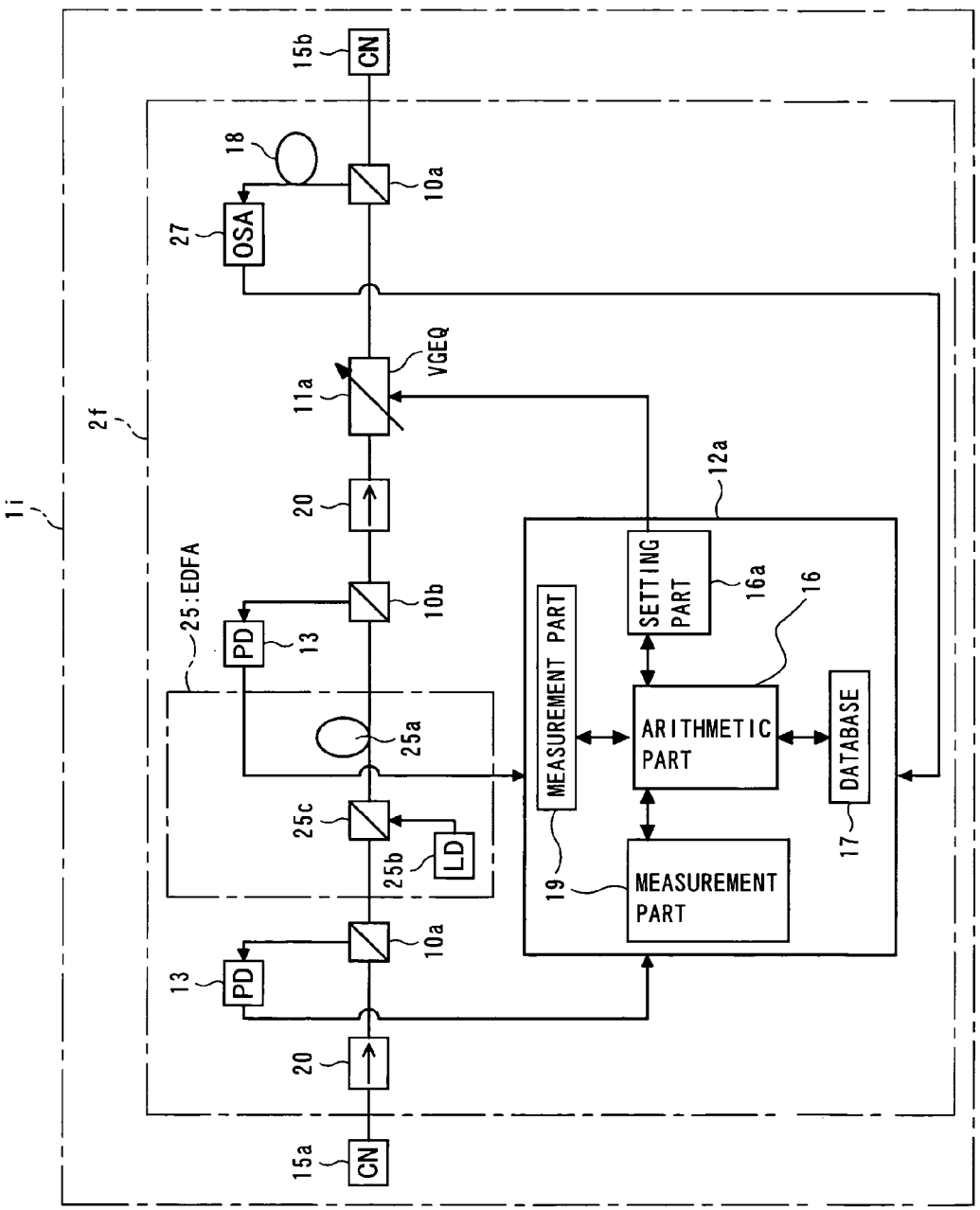
FIG. 17 is a simplified block diagram showing the optical transmission system constructed in accordance with the sixth embodiment of the present invention.

As an alteration of the above-described first embodiment, an optical spectrum analyzer can be used together. When the loss-wavelength characteristic (or gain-wavelength characteristic) set by a setting part 16*a* is shifted from a typical value (optimum value) during operation of an optical transmission system 1*h*, compensation for the difference can be made if it is slight. In FIGS. 16 and 17, a description will be given of a method that enhances control accuracy.

FIG. 16 shows the principle of operation of an optical transmission system constructed in accordance with a sixth embodiment of the present invention. The optical transmission system 1*h* shown in the figure is provided with an optical amplifier 2*e*. The optical amplifier 2*e* has an optical spectrum analyzer 27 to the output side of an optical filter 11a through a transmission line 18 and an optical coupler 10b. This optical spectrum analyzer 27 monitors and measures the optical spectrum and output optical power, contained in an optical signal output from the optical amplifier 2e.

With the above-described construction, the setting part 16a of the control part 12a first sets wavelength characteristic data to the optical filter 11a. Then, the optical spectrum analyzer 27 monitors a wavelength that is an object of service. The control part 12a judges whether the wavelength characteristic of the optical monitor 11a set by the setting part 16a is proper. And the control part 12a corrects the difference between the wavelength characteristic of transmission line 18 and the typical value set by the setting part 16a.

Therefore, the inverted wavelength characteristic to beset to the optical filter 11a is finely adjusted and control accuracy is enhanced. Thus, the control part 12a corrects a slight different between the wavelength characteristic of transmission line 18 and the typical value, so a transmission characteristic for each wavelength can be made uniform and enhanced.

FIG. 17 shows the optical transmission system constructed in accordance with the sixth embodiment of the present invention. An erbium-doped fiber amplifier (EDFA) 25 shown in the figure corresponds to the gain block 26 shown in FIG. 16.

In the optical transmission system 1i, light from the optical filter 11a is branched by the optical coupler 10a. The wavelength and power of the branched light are monitored by the optical spectrum analyzer 27. When the wavelength characteristic of transmission line 18 is slightly shifted from the previously set loss-wavelength characteristic, the control part 12a corrects that slight shift.

Thus, a slight shift from an optimum value is monitored and corrected, so control accuracy is enhanced.

(G) Description of the Seventh Embodiment

The seventh embodiment of the present invention is characterized in that it is provided with a plurality of optical amplifiers.

Figure 18:
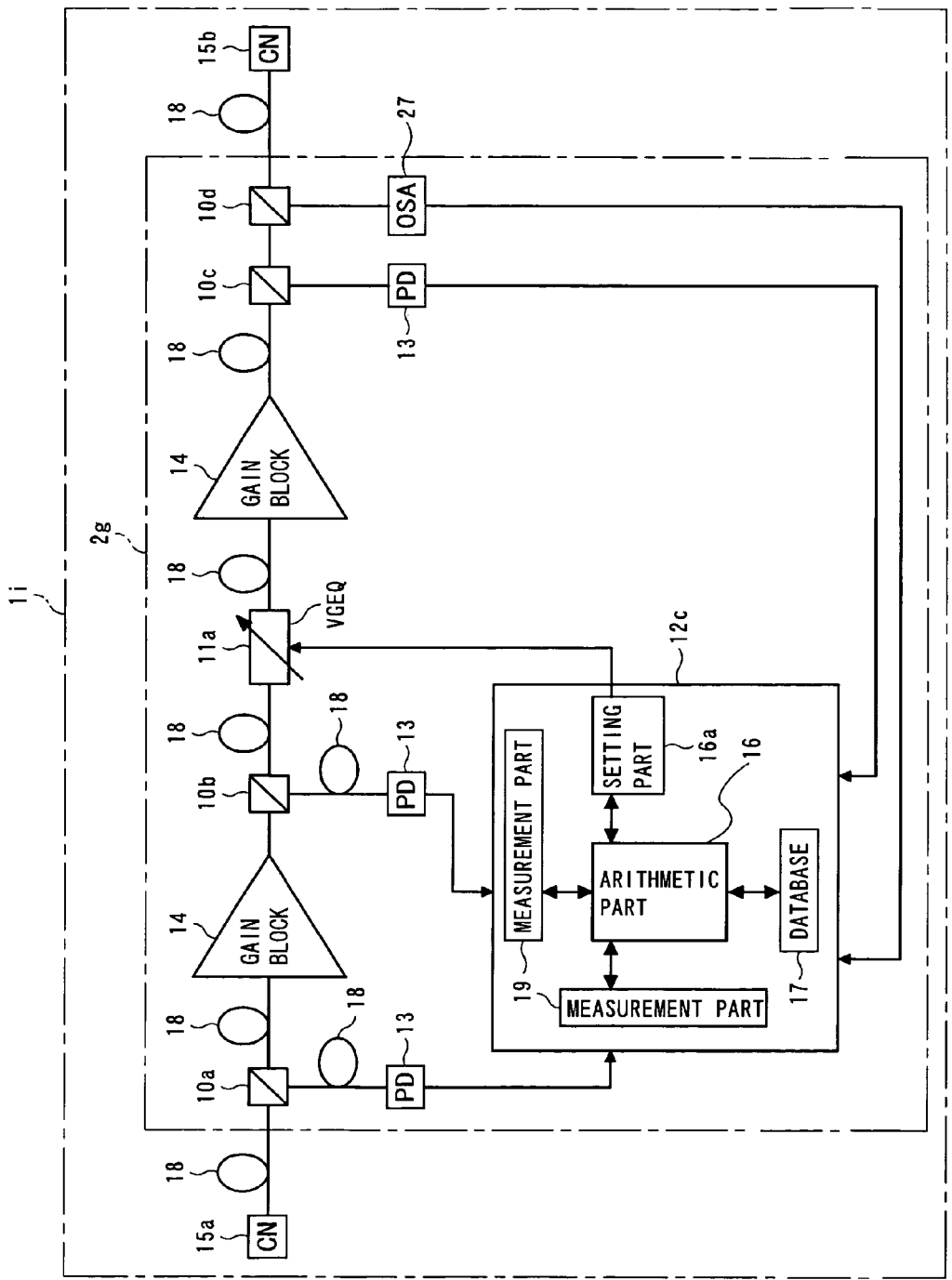
FIG. 18 is a diagram for explaining the principle of operation of an optical transmission system constructed in accordance with a seventh embodiment of the present invention.

FIG. 18 shows the principle of operation of an optical transmission system constructed in accordance with the seventh embodiment of the present invention. The optical transmission system 1i shown in the figure is equipped with an optical amplifier 2g. The optical amplifier 2g is equipped with gain blocks 14 of two stages and a control part 12c. The output light of the gain block 14 of the first stage (connected to a core network 15a) is converted into an electrical signal through a photodiode 13. The converted electrical signal is input to the control part 12c. The output light of the gain block 14 of the second stage (connected to a core network 15b) is branched at two places. That is, the output light of the gain block 14 of the second stage is branched at an optical coupler 10c. The branched light is input to the control part 12c through a photodiode 13. The branched light from an optical coupler 10c is further branched at an optical coupler 10d. The branched light from the optical coupler 10d is monitored by an optical spectrum analyzer 27. Thus, the output light from the gain block 14 of the second stage is input to the control part 12c as two kinds of monitored values.

An optical filter 11a shown in FIG. 18 is provided between the two different gain blocks 14 so that amplification, gain control, and amplification are constructed as one unit. However, the optical amplifier 2g may be provided with a plurality of units, which are constructed of a single optical filter 11a and three or more gain blocks 14.

Figure 19:
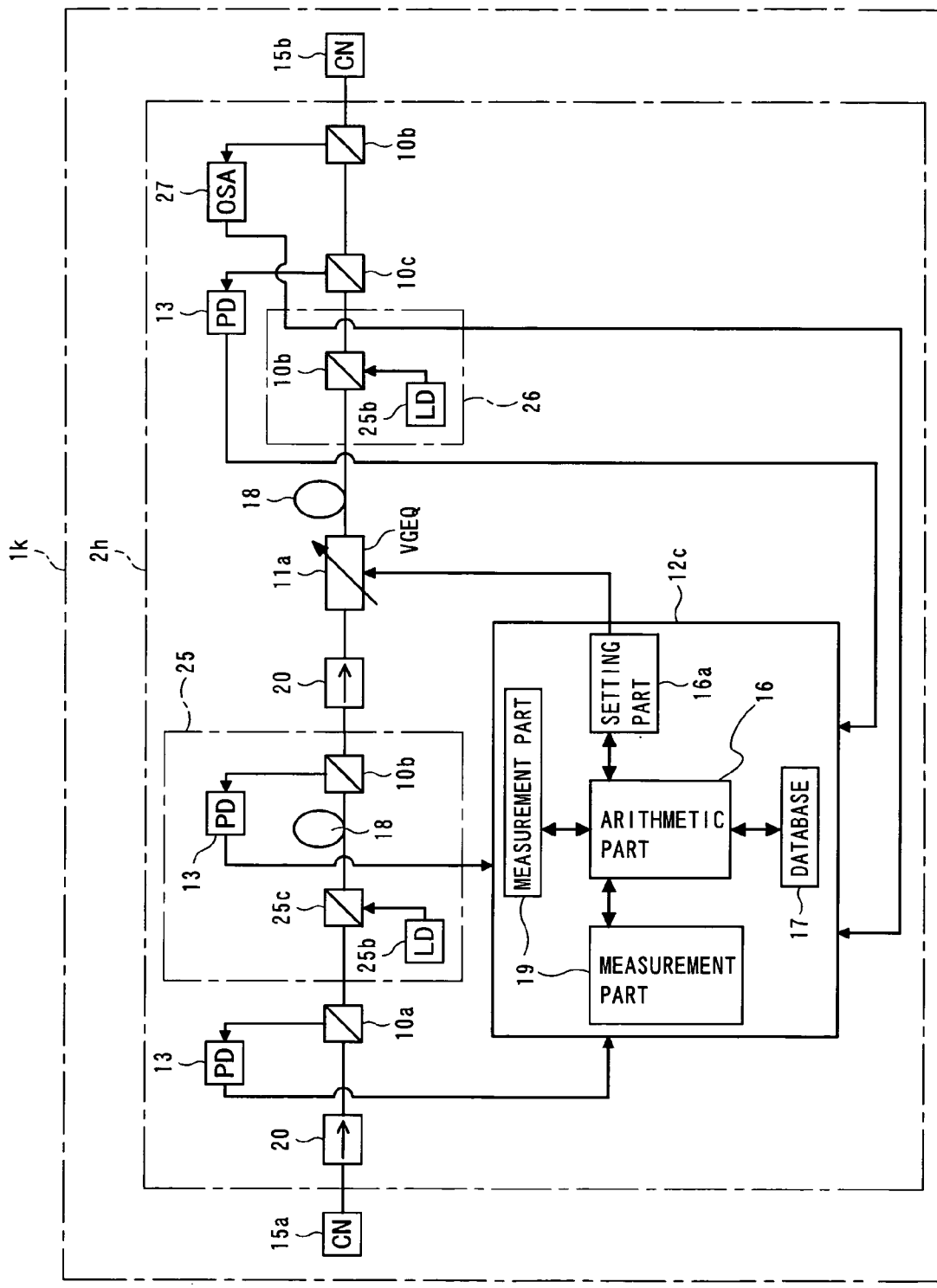
FIG. 19 is a simplified block diagram showing the optical transmission system constructed in accordance with the seventh embodiment of the present invention.

FIG. 19 shows the optical transmission system constructed in accordance with the seventh embodiment of the present invention. The gain blocks 14 are constructed of erbium-doped fiber amplifiers, respectively.

A first erbium-doped fiber amplifier 25 shown in FIG. 19 serves as a first-stage gain block, while a second erbium-doped fiber amplifier 26 serves as a second-stage gain block. The output light of the second erbium-doped fiber amplifier 26 is input to an optical spectrum analyzer 27 through an optical coupler 10b. The information data such as a monitored wavelength, power of the monitored wavelength, etc., obtained by the optical spectrum analyzer 27, is input to the control part 12c. That is, the input optical power and output optical power of the first erbium-doped fiber amplifier 25, output optical power of the second erbium-doped fiber amplifier 26, and the monitored wavelength, etc., of the second erbium-doped fiber amplifier 26 are converted into electrical signals, which are input to the control part 12c.

With the above-described construction, an optical signal input to the optical amplifier 2h is amplified by the first erbium-doped fiber amplifier 25, and the optical power is monitored before and after the first erbium-doped fiber amplifier 25. And the loss-wavelength characteristic of the first erbium-doped fiber amplifier 25 is adjusted. That is, the optical signal from the first erbium-doped fiber amplifier 25 is a signal in which the wavelength profile has been properly compensated. The output light from the optical filter 11a is further amplified by the second erbium-doped fiber amplifier 26. A part of the amplified optical signal is branched and monitored by the optical coupler 10c. Also, the wavelength and power contained in the output light from the second erbium-doped fiber amplifier 26 are both measured by the optical spectrum analyzer 27. The results of measurement are input to the control part 12c, whereby control accuracy is enhanced.

Thus, since a plurality of gain blocks 14 are all constructed of erbium-doped fiber amplifiers, an optical repeater, in which a plurality of optical amplifiers of saturated-state operation are connected and which can output desired gain, can be constructed. In addition, a fluctuation in a wavelength characteristic with respect to input optical power, such as a noise figure (NF), etc., can be reduced.

Note that as a first alteration, the arithmetic part 16 can also receive information about the type, length, and wavelength number of transmission line 18 connected to the optical amplifier 2g, from SV light transmitted from an upstream station.

As a second alteration, the arithmetic part 16 can also control the loss-wavelength characteristic of transmission line 18 so as to compensate transmission-side transmission line 18. The transmission wavelength number and output-side transmission line 18 can also beset, based on information contained SV light transmitted from an upstream distant station and a downstream distant station, respectively.

(H) Description of the Eighth Embodiment

In order to compensate the wavelength characteristic of the optical filter 11a more accurately, the database 17 holds wavelength-number information and the control part 12a (or 12b) compensates for the non-uniformity of the gain of the gain block 14, whereby compensation accuracy can be enhanced.

Figure 20:
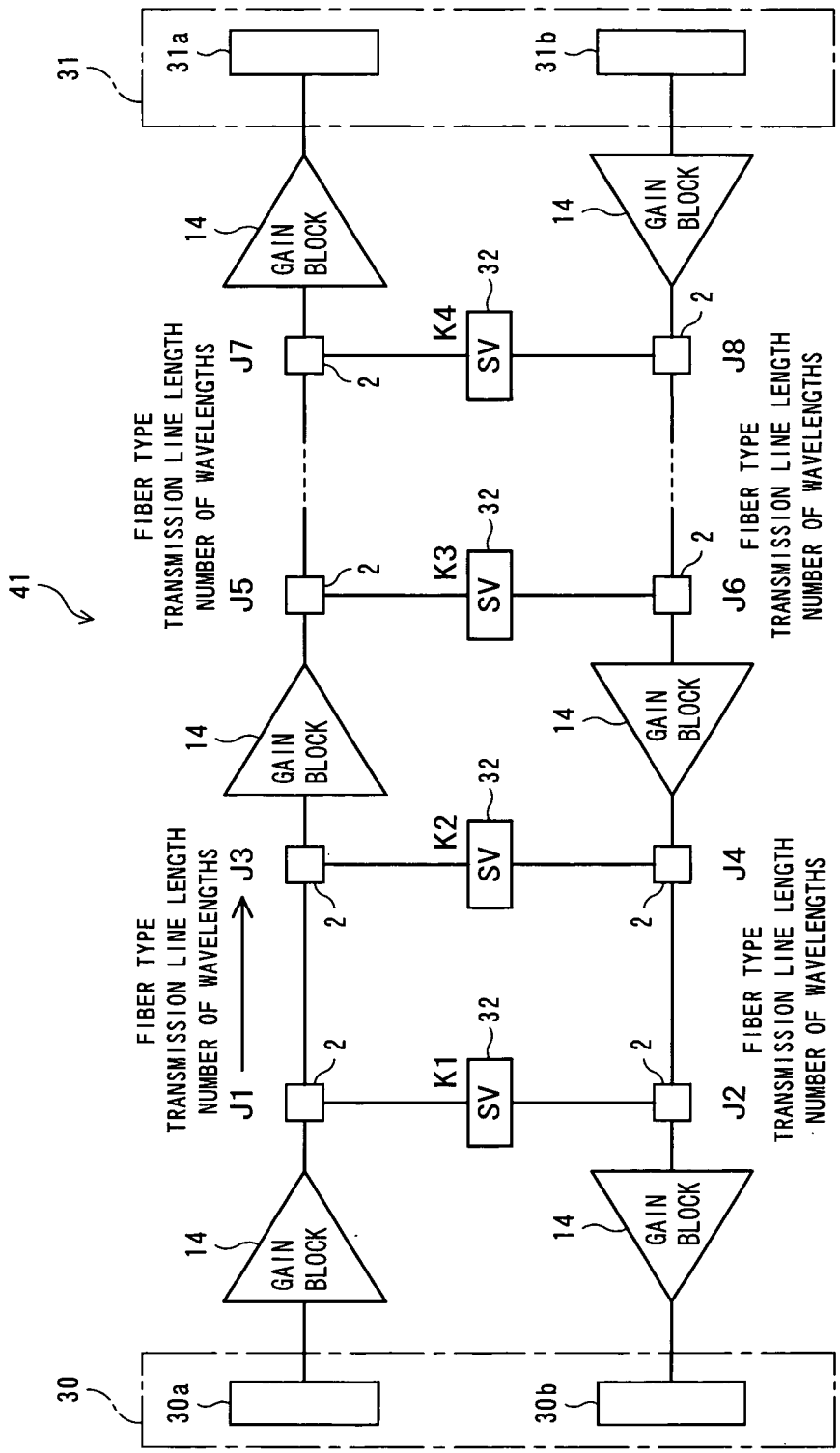
FIG. 20 is a simplified block diagram showing an optical transmission system constructed in accordance with an eighth embodiment of the present invention.

FIG. 20 shows the optical transmission system constructed in accordance with the eighth embodiment of the present invention. In the figure, optical signals can be transmitted in a first direction (direction from the first core network 15a toward the second core network 15b) and a second direction (direction from the second core network 15*b* toward the first core network 15*a*). In the two transmission lines 18, repeater stations transfer both WDM light and SV light. Also, data contents to be inserted in SV light are input-side fiber type, transmission line length, and wavelength number (number of multiplexed wavelengths), and at least these three kinds are transmitted from an upstream repeater station to a downstream repeater stations through SV light.

Note that the optical amplifier 2 shown in FIG. 20 is the same as the optical amplifier 2 shown in FIG. 1, etc. Also, it can be constructed of an erbium-doped fiber amplifier or Raman fiber amplifier.

Next, in the optical amplifier 2 shown in FIG. 20, an inverted passing-wavelength characteristic for an optical filter 11*a* is computed as follows.

The objects to be computed by the arithmetic part 16 (not shown) are the WDL of an input-side fiber, the quantity of SRS, and the WDG of an erbium-doped fiber amplifier. That is, the arithmetic part 16 computes the inverted passing-wavelength characteristic of the optical filter 11*a*, based on data causing wavelength-multiplexed number data and a loss-wavelength characteristic due to a stimulated Raman dispersion effect to correspond to each other. The data required for computing these are acquired from the SV light from a distant station and the input light and output light of a self-station.

More specifically, the optical amplifier 2 decodes the SV light from a distant station to acquire (1) input-side transmission line type, (2) transmission line length, and (3) the number of operating wavelengths, contained in the SV light. The optical amplifier 2 also computes the WDL of an input-side fiber, the quantity of SRS, and the WDG of an erbium-doped fiber amplifier, based on the input performance-monitored value and output performance-monitored value of the optical amplifier 2 of the self-station. And the optical amplifier 2 controls the optical fiber 11*a* so as to correct these values.

In other words, the control part 16 computes the inverted passing-wavelength characteristic of the optical filter 11*a*, based on first data contained in received light from the upstream side (first direction side) and representing a loss-wavelength characteristic for each type of transmission line 18 provided on the upstream side, and wavelength-multiplexed number data contained in received light from the downstream side (second direction side). Also, the setting part 16*a* sets the passing-wavelength characteristic of the upstream portion of the transmission line 18. Thus, the computation of the inverted passing-wavelength characteristic by the variable gain equalizer (VGEQ) can be simplified.

The loss-wavelength characteristic of the optical filter 11*a* can be controlled by the three following methods.

First, adjacent optical amplifiers 2 transmit SV light when controlling the wavelength characteristic of the optical filter 11*a*. The optical amplifiers 2 respectively adjust a loss-wavelength characteristic finely, based on a value obtained by the upstream optical spectrum analyzer 27. The optical amplifiers 2 transmit completion messages, indicating that the fine adjustment has been completed, to each other. And upstream repeater stations receiving the completion message tune the wavelength characteristic of the optical filter 11*a* of each optical amplifier 2 finely to a proper value in sequence.

Second, in the same construction as the first construction, the arithmetic part 16 computes the WDL of an output-side fiber and the quantity of SRS, by directly employing the information transmitted from an output-side distant station or information set to the optical amplifier 2 of the self-station by the self-station (e.g., (1) type of transmission line 18, (2) transmission line length, and (3) number of operating wavelengths, on the output side), without the information (fiber information) transmitted from an upstream station. The arithmetic part 16 further computes WDG from the input performance-monitored value and output performance-monitored value of the optical amplifier 2 of the self-station, and controls the optical filter so as to correct these. And the control part 12 decodes WDM light that is input to a downstream distant station, and performs control so that the SN ratios of WDM signals become uniform. After this control has been carried out, the optical spectrum analyzer 27 of a downstream distant station inserts the power-monitored value for each wavelength of an input optical signal into SV light and transfers the SV light to an adjacent repeater station. In this way, fine adjustments are made.

Third, the control part 16 makes a fine adjustment so as to correct a shift from an optimum value, based on a value monitored by the spectrum analyzer 27 of the self-station and a previously computed target value, without a value monitored by the spectrum analyzer of a downstream distant station.

Thus, the loss-wavelength characteristic is controlled, for example, by three methods, so the loss-wavelength characteristic of the optical filter 11*a* is properly controlled according to the state of transmission.

With the above-described construction, the control of wavelength characteristics in the eighth embodiment is carried out.

Figure 21:
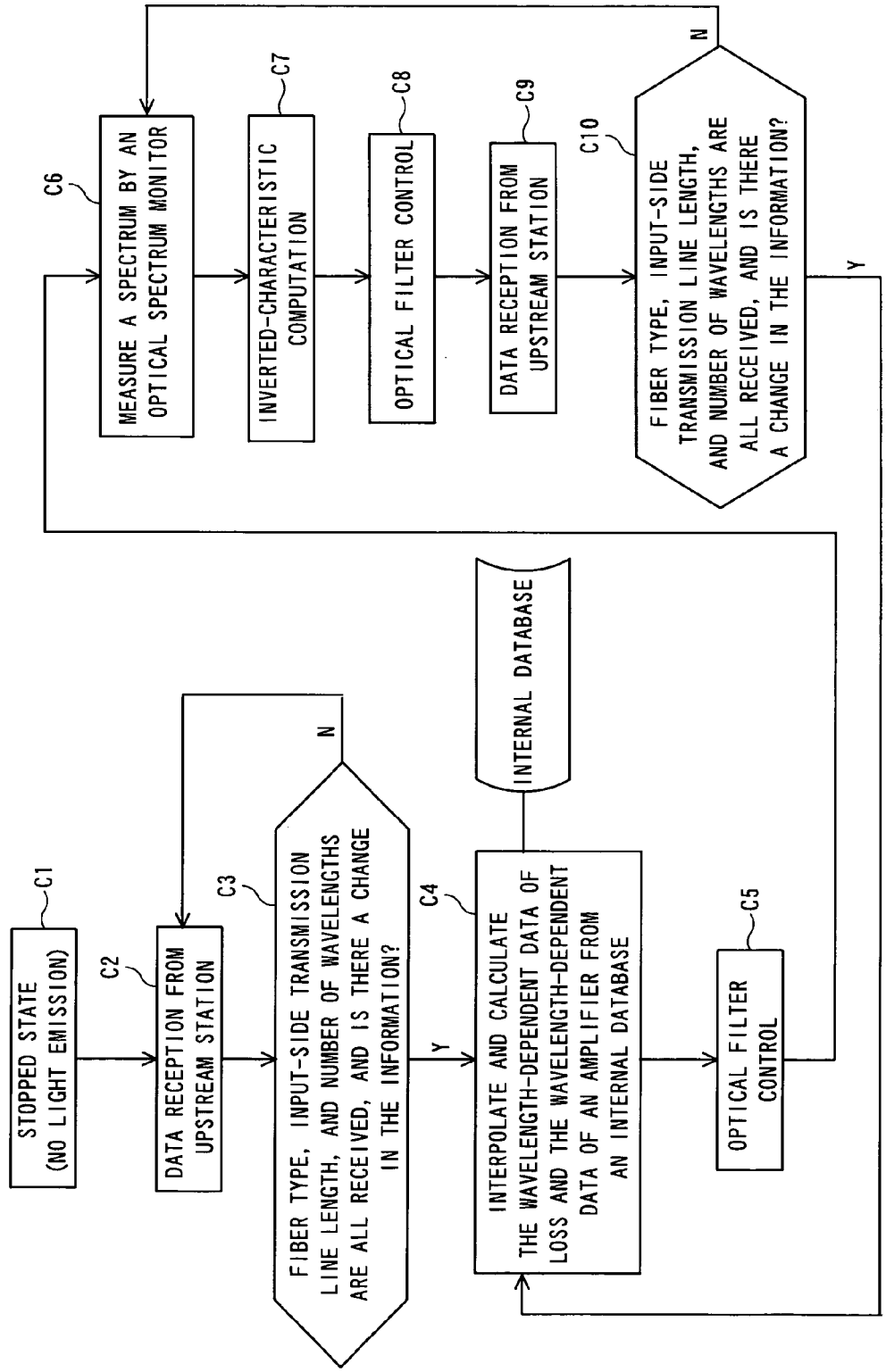
FIG. 21 is a flowchart for explaining how a passing-wavelength characteristic is controlled in accordance with the eighth embodiment of the present invention.

FIG. 21 shows a flowchart for explaining how the passing-wavelength characteristic of an optical filter 11*a* is controlled in accordance with the eighth embodiment of the present invention. The optical amplifier 2 stops an excitation laser from emitting light (step C1). In the stopped state, if data from an upstream station is received (step C2), the acquiring part (32, 13) judges whether the type of transmission line 18, etc., have all been received, and judges whether the information has been changed (step C3). When there is no change, step C2 is performed again. On the other hand, when there is a change in the information, the arithmetic part 16 computes wavelength characteristic data for the optical amplifier 2 by interpolation, using the loss-wavelength characteristic data held in the internal database 17 (step C4). Also, the setting part 16*a* sets the computed characteristic data to the optical filter 11*a*, whereby the optical filter 11*a* is controlled (step C5).

The spectrum analyzer 27 monitors and measures a spectrum (step C6), and the arithmetic part 16 computes an inverted passing-wavelength characteristic using this spectrum (step C7), and controls the optical filter 11*a* (step C8).

And the optical amplifier 2 is again caused to be in a wait state. If data from an upstream station is received (step C9), the optical amplifier 2 judges whether the type and length of input-side transmission line 18 and number of wavelengths have all been received, and judges whether the information has been changed (step C10). When there is no change, step C4 is performed again. On the other hand, when all of the type of input-side transmission line 18, etc., are not received, or when there is a change in the information, step C6 and steps thereafter are again performed.

Thus, by employing the above-described construction and control, the arithmetic part 16 can absorb non-uniformity of quality that occurs when transmission line 18 itself is manufactured. Also, when a slight shift from a typical value occurs because of aged degradation of the erbium-doped fiber amplifier 25, etc., the arithmetic part 16 can absorb that shift from an initial set value.

In this way, a transmission characteristic for each wavelength can be made uniform and enhanced. Also, in the case where aged degradation occurs in some of the optical components, a shift from a set value that results from degradation can be efficiently absorbed.

(I) Description of the Ninth Embodiment

In the ninth embodiment of the present invention, the gain-wavelength characteristic of a gain block constructed of a Raman fiber amplifier is tuned, so control is performed with an even higher degree of accuracy.

Figure 22:
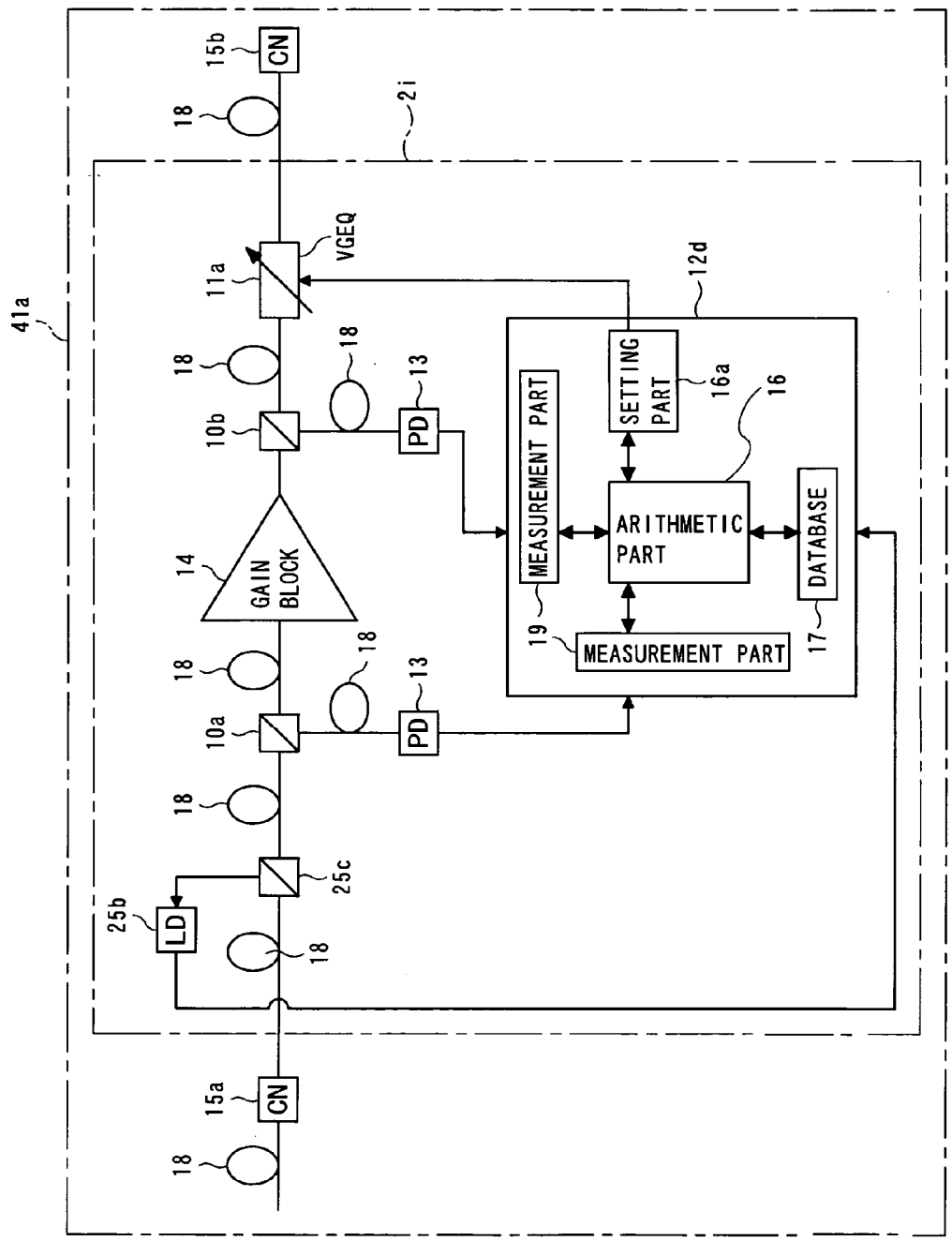
FIG. 22 is a diagram for explaining the principle of operation of an optical transmission system constructed in accordance with a ninth embodiment of the present invention.

FIG. 22 shows the principle of operation of an optical transmission system constructed in accordance with the ninth embodiment of the present invention. The optical transmission system 41a shown in the figure is equipped with an optical fiber 2i, which is constructed of a Raman fiber amplifier. The function of this Raman fiber amplifier is exhibited by a transmission line 18, an excitation laser 25b, and an optical coupler 25c. A control part 12b is used for controlling the output optical power of the input-side excitation laser 25b and also controlling the loss-wavelength characteristic of an optical filter 11a provided on the output side of the optical amplifier 2i. Note in FIG. 22 that parts with the same reference numerals as those described above have the same functions.

The optical filter 11a operates in cooperation with the Raman fiber amplifier that is controlled by the control part 12b. For instance, with reference to WDL representing the loss of transmission line 18, a desired wavelength band is compensated in input-side transmission line 18 by changing the excitation ratio of the Raman fiber amplifier that is controlled by the control part 12b. In the case where the optical amplifier is constructed of an erbium-doped fiber amplifier, it is also possible to compensate the WDG of that optical amplifier by the optical filter 11a.

WDL due to transmission line 18 is great, and if the sum of quantities corrected with a Raman fiber amplifier alone or optical filter 11a alone is used as a correction quantity, it becomes great and therefore compensation by a Raman fiber amplifier alone or optical filter 11a alone becomes difficult. In such a case, a few 10% of the WDL of the transmission line 18 can be compensated by an upstream optical fiber 11a and the remaining percent of the WDL can be compensated by a downstream Raman fiber amplifier.

Figure 23:
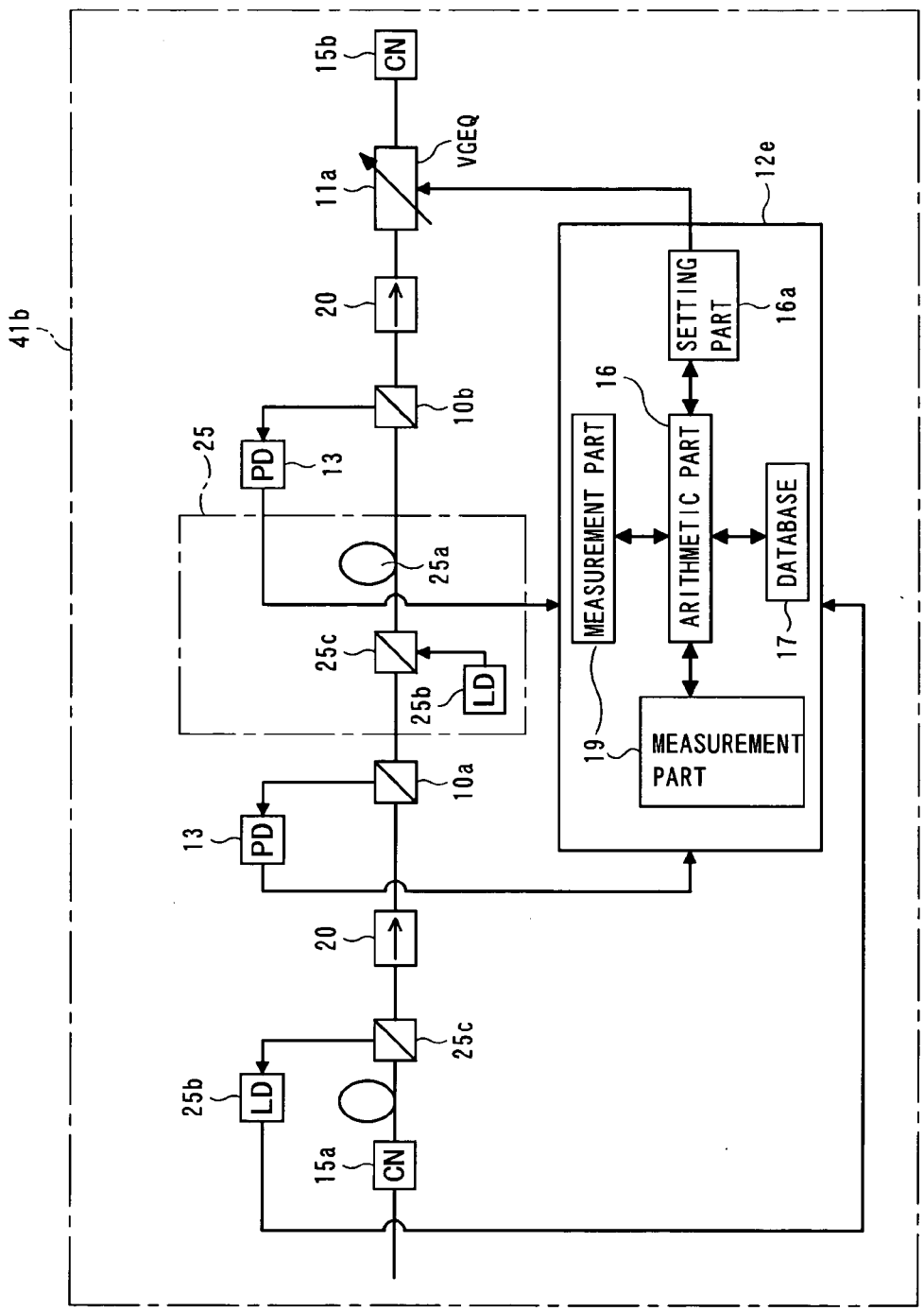
FIG. 23 is a simplified block diagram showing the optical transmission system constructed in accordance with the ninth embodiment of the present invention.
Figure 24A:
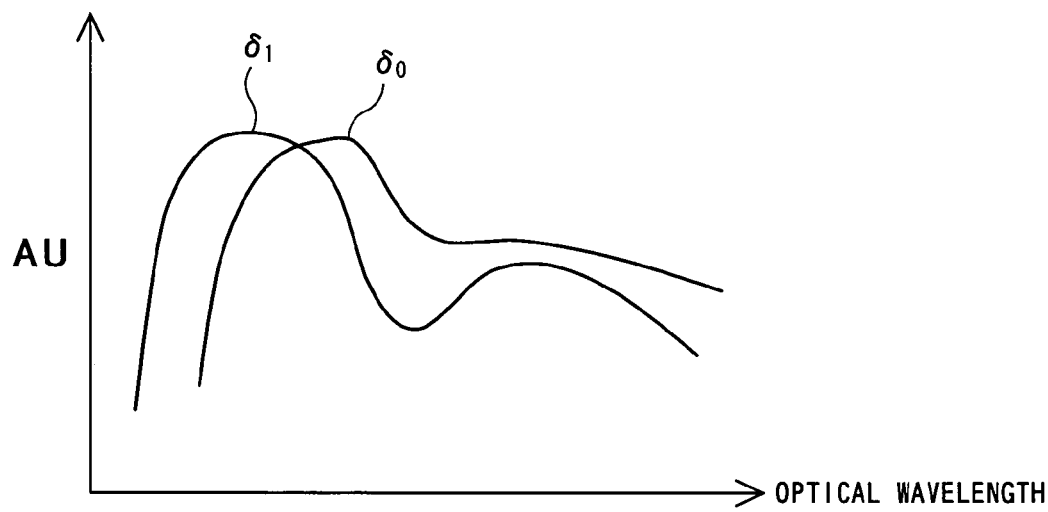
FIG. 24A is a diagram showing the shape of the gain profile of an erbium-doped fiber.
Figure 24B:
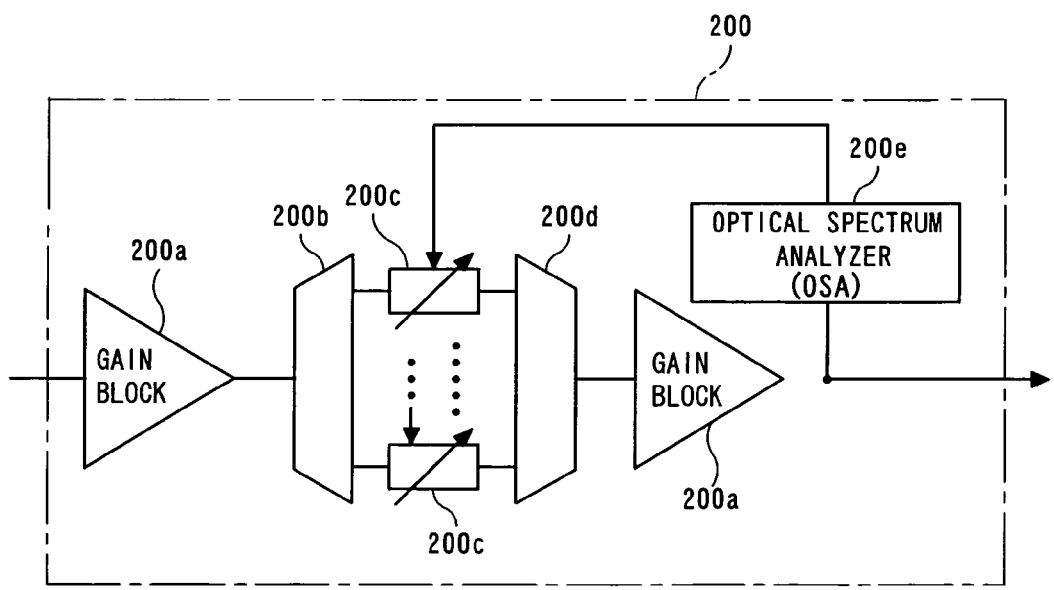
FIG. 24B is a diagram showing an example of an optical power monitor employing an optical spectrum analyzer.

FIG. 23 shows the optical transmission system constructed in accordance with the ninth embodiment of the present invention. The optical transmission system 41b shown in the figure is equipped with a Raman fiber amplifier 25, which consists of a transmission line 18, an excitation laser 25b, and an optical coupler 25c.

In the optical transmission system 41b constructed as described above, with reference to WDL representing the loss of the transmission line 18, a desired wavelength band is compensated in input-side transmission line 18 by changing the excitation ratio of the Raman fiber amplifier that is controlled by the control part 12b. In the case where the optical amplifier is constructed of an erbium-doped fiber amplifier, it is also possible to compensate the WDG of that optical amplifier by the optical filter 11a.

Thus, by employing the ninth embodiment, desired compensation becomes possible.

And in the optical transmission system 41b, transmission line 18 can have a wide range capable of compensating for wavelength characteristic loss and gain, so a transmission characteristic for each wavelength can be made uniform and enhanced in various environments.

(J) Others

While the present invention has been described with reference to the preferred embodiments thereof, the invention is not to be limited to the details given herein, but may be modified within the scope of the invention hereinafter claimed.

Loss-wavelength characteristics and gain-wavelength characteristics can be represented as gain-wavelength characteristics and utilization-wavelength characteristics.

The invention claimed is:

1. An optical amplifier comprising:
    an amplification medium for amplifying wavelength-division-multiplexed (WDM) light passed through an upstream transmission line using an excitation light;
    a measurement part for measuring both of optical power of said WDM light inputted to said amplification medium and optical power of said WDM light outputted from said amplification medium;
    a variable gain equalizer connected to a downstream transmission line and capable of variably gain equalizing of said WDM light amplified by said amplification medium;
    a database for holding loss-wavelength characteristics data according to a plurality of transmission line types and gain-wavelength characteristics data according to a plurality of amplifying medium types with an input optical power and an output optical power as parameters;
    an arithmetic part for computing an inverted characteristic of passing-wavelength characteristic of said transmission line and said amplification medium, on the basis of said loss-wavelength characteristic data according to a type of said transmission line held in said database and said gain-wavelength characteristic data according to a type of said amplification medium specified by said parameters, held in said database; and
    a setting part for setting a passing-wavelength characteristic of said variable gain equalizer to said inverted passing-wavelength characteristic computed by said arithmetic part.

2. The optical amplifier as set forth in claim 1, further comprising:
    an acquisition part for acquiring the type of said transmission line used,
    wherein said arithmetic part computes the inverted characteristic of passing-wavelength characteristic of said transmission line on the basis of said loss-wavelength characteristic data according to the type of said transmission line acquired by said acquisition part.

3. The optical amplifier as set forth in claim 1, wherein:
    said database holds wavelength characteristics respectively corresponding to the input optical power and output optical power of a centralized amplification type transmission line; and
    said arithmetic part is constructed to compute said inverted passing-wavelength characteristic, based on said wavelength characteristics corresponding to said input optical power and output optical power held in said database.

4. The optical amplifier as set forth in claim 3, wherein said arithmetic part is constructed to compute said inverted passing-wavelength characteristic so that gain of said centralized amplification type transmission line is constant.

5. The optical amplifier as set forth in claim 1, wherein:
    said arithmetic part is constructed to compute said inverted passing-wavelength characteristic, based on said data representing wavelength characteristics that respectively correspond to transmission line types, contained in light received from a first direction side and provided on said first direction side, and based on the number of multiplexed wavelengths contained in light received from a second direction side; and said setting part is constructed to set a passing-wavelength characteristic of a portion in the first direction side of said transmission line.

6. The optical amplifier as set forth in claim 1, wherein:

said amplification medium employs a centralized amplification type transmission line to amplify WDM light; and said setting part is constructed to set said passing-wavelength characteristic, based on input optical power and output optical power of said centralized amplification type transmission line, after said variable gain equalizer has been booted.

7. The optical amplifier as set forth in claim 5, wherein:

said arithmetic part is constructed to compute said inverted passing-wavelength characteristic for said first direction side, based on the data contained in received light; and said setting part is constructed to set the inverted passing-wavelength characteristic to a portion in the first direction side of said transmission line, based on the data held in said database.

8. The optical amplifier as set forth in claim 5, wherein:

said arithmetic part is constructed to compute said inverted passing-wavelength characteristic for said first direction side, based on the first data from the self-station; and said setting part is constructed to set said inverted passing-wavelength characteristic to a portion in the first direction side of said transmission line, based on second data held in said database.

9. An optical amplifier comprising:

an amplification medium for amplifying wavelength-division multiplexed (WDM) light propagating in a transmission line using an excitation light;

a measurement part for measuring optical power of said excitation light;

a variable gain equalizer connected to a downstream transmission line and capable of variably gain equalizing of said WDM light amplified by said amplification medium;

a database for holding loss-wavelength characteristics data according to a plurality of transmission line types and gain-wavelength characteristics data according to a plurality of amplifying medium types with an excitation power as parameter;

an arithmetic part for computing an inverted characteristic of passing-wavelength characteristic of said transmission line and said amplification medium, on the basis of said loss-wavelength characteristics data according to a type of said transmission line held in said database and said gain-wavelength characteristic data according to a type of said amplification medium specified by said parameter, held in said database; and a setting part for setting a passing-wavelength characteristic of said variable gain equalizer to said inverted passing-wavelength characteristic computed by said arithmetic part.

10. The optical amplifier according to claim 9, further comprising:

an acquisition part for acquiring the type of said transmission line used, wherein said arithmetic part computes the inverted characteristic of passing-wavelength characteristic of said transmission line on the basis of said loss-wavelength characteristic data according to the type of transmission line acquired by said acquisition part.

11. The optical amplifier as set forth in claim 9, wherein said measurement part measures a power of excitation light on the input side of said amplification medium.

12. The optical amplifier as set forth in claim 9, wherein said database further holds information about a transmission line length connected to said amplification medium.

13. The optical amplifier as set forth in claim 12, wherein said arithmetic part is constructed to compute said inverted passing-wavelength characteristic, based on data causing the number of multiplexed wavelengths and a wavelength characteristic due to a stimulated Raman scattering effect to correspond to each other.

14. The optical amplifier as set forth in claim 10, wherein said acquisition part is constructed to obtain at least either information about a type of transmission line connected to said amplification medium or information about a length of said transmission line, from either monitoring light from an upstream side of said transmission line or a device monitoring system that monitors a status of transmission.

15. The optical amplifier as set forth in claim 9, wherein:

said database holds a wavelength characteristic corresponding to a power of excitation light of a transmission-line amplification type transmission line; and said arithmetic part is constructed to compute said inverted passing-wavelength characteristic, based on said wavelength characteristics respectively corresponding to said power of excitation light held in said database and said output optical power measured by said measurement part.

16. The optical amplifier as set forth in claim 9, wherein:

said arithmetic part is constructed to computer said inverted passing-wavelength characteristic, based on said data representing wavelength characteristics that respectively correspond to transmission line types, contained in light received from a first direction side and provided on said first direction side, and based on the number of multiplexed wavelengths contained in light received from a second direction side; and said setting part is constructed to set a passing-wavelength characteristic of a portion in the first direction side of said transmission line.

17. The optical amplifier as set forth in claim 9, wherein:

said amplification medium employs a Raman amplification type transmission line to amplify WDM light; and said setting part is constructed to set said passing-wavelength characteristic, based on power of excitation light of said Raman amplification type transmission line, after said variable gain equalizer has been booted.

18. The optical amplifier as set forth in claim 16, wherein:

said arithmetic part is constructed to compute said inverted passing-wavelength characteristic for said first direction side, based on the data contained in received light; and said setting part is constructed to set the inverted passing-wavelength characteristic to a portion in the first direction side of said transmission line, based on the data held in said database.

19. The optical amplifier as set forth in claim 16, wherein:

said arithmetic part is constructed to compute said inverted passing-wavelength characteristic for said first direction side, based on the first data from the self-station; and said setting part is constructed to set said inverted passing-wavelength characteristic to a portion in the first direction side of said transmission line, based on second data held in said database.

* * * * *